(12) United States Patent
Ting et al.

(10) Patent No.: US 7,165,147 B2
(45) Date of Patent: Jan. 16, 2007

(54) ISOLATED ORDERED REGIONS (IOR) PREFETCHING AND PAGE REPLACEMENT

(75) Inventors: Edison Lao Ting, San Jose, CA (US); James C. Kleewein, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 10/604,453

(22) Filed: Jul. 22, 2003

(65) Prior Publication Data

US 2005/0018152 A1    Jan. 27, 2005

(51) Int. Cl.
*G06F 12/00* (2006.01)
*G06F 12/12* (2006.01)

(52) U.S. Cl. .................. 711/137; 711/159; 707/200

(58) Field of Classification Search .............. None
See application file for complete search history.

(56) References Cited

U.S. PATENT DOCUMENTS

| | | | |
|---|---|---|---|
| 5,485,609 A * | 1/1996 | Vitter et al. ............... 707/101 |
| 5,809,563 A | 9/1998 | Yamada et al. ............ 711/207 |
| 5,897,660 A | 4/1999 | Reinders et al. ........... 711/170 |
| 6,026,474 A | 2/2000 | Carter et al. ............... 711/202 |
| 6,067,565 A | 5/2000 | Horvitz ..................... 709/218 |
| 6,081,799 A | 6/2000 | Beavin et al. ................ 707/2 |
| 6,085,193 A | 7/2000 | Malkin et al. ............... 707/10 |
| 6,154,813 A * | 11/2000 | Martin et al. .............. 711/133 |
| 6,307,548 B1 * | 10/2001 | Flinchem et al. ........... 715/811 |
| 6,347,364 B1 | 2/2002 | Liedtke ..................... 711/163 |
| 6,385,641 B1 | 5/2002 | Jiang et al. ................. 709/203 |
| 6,408,364 B1 | 6/2002 | Tan et al. ................... 711/136 |
| 6,408,368 B1 | 6/2002 | Parady ....................... 711/159 |
| 6,473,840 B1 | 10/2002 | Matthews et al. .......... 711/154 |
| 6,496,912 B1 | 12/2002 | Fields, Jr. et al. .......... 711/170 |
| 2002/0078165 A1 | 6/2002 | Genty et al. ............... 709/217 |
| 2002/0103778 A1 | 8/2002 | Saxena ......................... 707/1 |
| 2003/0018661 A1 * | 1/2003 | Darugar ..................... 707/500 |
| 2003/0018876 A1 | 1/2003 | Zahir et al. ................ 711/206 |
| 2003/0079087 A1 * | 4/2003 | Kuwata ..................... 711/136 |

OTHER PUBLICATIONS

Bliujūtė et al., "R-Tree Based Indexing of Now-Relative Bitemporal Data," *Proceedings of the 24th VLDB Conference*, 1998, pp. 345-356.

Dan et al., "Detection of a Stable Hot Data Set," *IBM Technical Disclosure Bulletin*, vol. 38, No. 11, Nov. 1995, pp. 117-119.

(Continued)

*Primary Examiner*—Matthew Kim
*Assistant Examiner*—Michael Krofcheck
(74) *Attorney, Agent, or Firm*—Lacasse & Associates, LLC; Ramraj Soundararajan

(57) ABSTRACT

The concept of isolated ordered regions to maintain coordinates of nodes is used by associating each node with coordinates relative to a containing region. Modifications to nodes within a region only affect the nodes in that region, and not nodes in other regions. Traversals that retrieve information from the nodes can rebase the coordinates from their containing region and return with a total order. Access patterns and usage are used to recognize and prefetch pages. The probability of revisiting traversed nodes are identified and pages in a bufferpool are replaced based upon the identified probabilities (e.g., replacing pages with the least probability of a revisit).

26 Claims, 25 Drawing Sheets

OTHER PUBLICATIONS

Gatti et al., "A Comparison Among Different Synchronized Tree Traversal Algorithms for Spatial Joins," Institute of Computing, University of Campinas.

Khuri et al., "Visualizing the CPU Scheduler and Page Replacement Algorithms," *SIGCSE '99*, Mar. 1999, pp. 227-231.

Malkawi et al., "Page Replacement in Distributed Virtual Memory Systems," *Proceedings of the 4th IEEE Symposium on Parallel and Distributed Processing*, 1992, pp. 394-401.

Vuskovic, "Chapter 5: Virtual Memory," *Operating Systems*, 1998-2002, pp. 5-1-5-17.

* cited by examiner

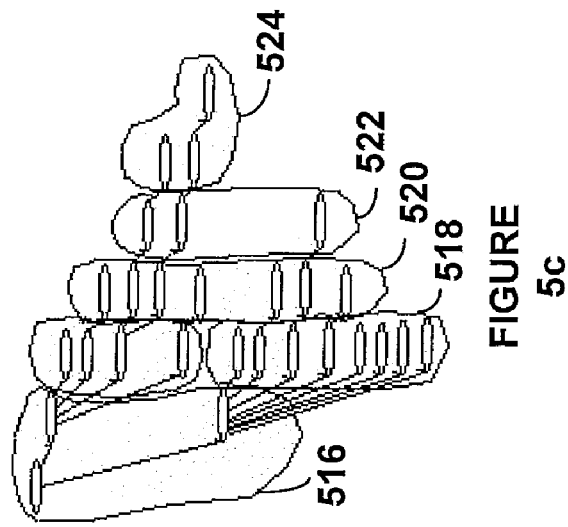
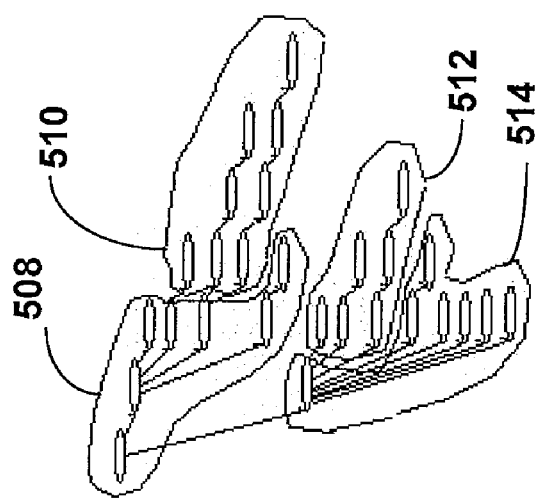
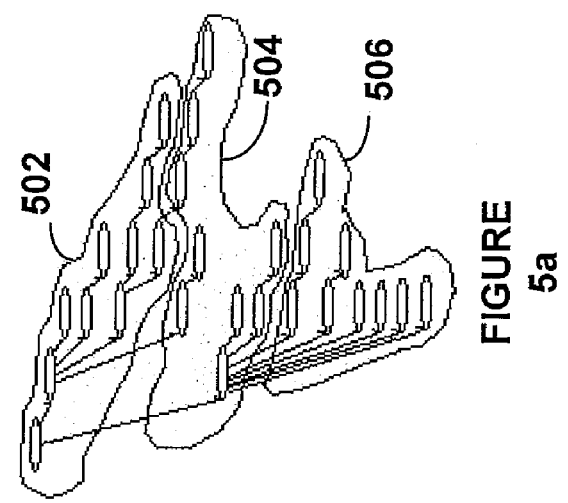
FIGURE 5a
FIGURE 5b
FIGURE 5c

ISOLATED ORDERED REGIONS (IOR) PREFETCHING AND PAGE REPLACEMENT

BACKGROUND OF INVENTION

1. Field of Invention

The present invention relates generally to prefetching and page replacement. More specifically, the present invention is related to a novel method for prefetching and page replacement based upon grouping nodes of hierarchical data into a plurality of regions.

2. Discussion of Prior Art

In transactional systems, finite amounts of pages (free pages) are allocated from memory to hold data from disks. When all free pages are used, that is when all pages contain valid data; when more pages are needed, then certain pages are chosen for replacement. The module that determines which pages to be replaced is the bufferpool component. The bufferpool component tries to keep frequently used pages in memory while replacing others by using well-known protocols. For example, it can try to replace the pages lease recently used in the system (LRU) or the pages most recently used in the system (MRU).

Bufferpool managers currently use a number of techniques in deciding which pages to replace in the system. One way, as shown in FIG. 1, is to use a clock pointer, which is an atomic variable that indexes into a circular array of page descriptors. Within the page descriptors is information that describes bufferpool pages, such as the pointer to the page, a fix count or reference count, description of the contents of the page, and a weight count. The weight count is assigned to a page when the system unfixes (unreferences) a page, and it reflects the probability of that page being referenced in the future. When the free page list is exhausted, the clock pointer is "moved" to point to the pages in the list in a clockwise fashion. While the clock pointer moves from one page descriptor to the next, it decrements the weight count in the current page descriptor. If the clock pointer encounters a page descriptor whose fixed count is zero and whose weight count is below a threshold value, it chooses that page for page replacement. Therefore, the higher weight count assigned to a page, the more likely the page will stay in memory in the bufferpool. Typically, the system assigns high weight counts to pages it knows will be referenced often, such as the root page of an index or a control page.

Another technique, as shown in FIG. 2, uses a linked list of page descriptors pointed to by a head pointer and a tail pointer. Pages are added to the linked list when they're unfixed. If the page is unlikely to be needed in the future, it is added to the head of the list. If it is likely to be referenced in the future, it is placed on the tail of the list. The next page to be replaced will be picked from the head of the list.

The following references provide for a general teaching with regard to page replacement, but they fail to provide for the claimed invention's robust method and system of page replacement in ordered nodes wherein the nodes are ordered into isolated regions.

U.S. patent application publication 2003/0018876 A1 provides for virtual memory mapping using region-based page tables, wherein a region register file provides a region identifier for a virtual address in a virtual memory space. The virtual address includes a virtual region number and a virtual page number. A virtual page table look-up circuit is coupled to the region register file to generate a page table entry (PTE) virtual address from virtual address parameters. The virtual address parameters include the virtual address.

U.S. Pat. No. 6,496,912 discloses a system, method, and software for memory management with intelligent trimming of pages of working sets. The computer system has memory space allocatable in chunks, known as pages, to specific application programs or processes. Also disclosed is a trimming method that estimates numbers of trimmable pages for working sets based upon a measure of how much time has elapsed since the memory pages were last accessed by the corresponding application program.

U.S. Pat. No. 6,473,840 discloses a data processing system having a network and method for managing memory by storing discardable pages in a local paging device. A discardable page that is to be removed from the memory is identified. A determination is made as to whether performance will increase by storing the discardable page in a paging device located within the data processing system. If it is determined that performance will increase, the discardable page is marked as a paged discardable page and stored in the paging device locally, wherein this page may be retrieved from the paging device. The paging device may take the form of a paging file, such as a swap file. If space is unavailable within the paging device, the discardable page may be discarded. These processes may be implemented in a network computer.

U.S. Pat. No. 6,408,368 discloses an operating system page placement to maximize cache data reuse. The operating system designates one or more pages containing critical data, text, or other digital information as hot pages within a physical system memory in the computer system and prevents replacement during execution of various application programs of these hot pages when cached. The operating system inhibits allocation of the conflict pages that would map to cache locations occupied by a cached hot page, thereby preserving the hot page within the cache memory. The conflict pages are placed at the bottom of a free list created in the system memory by the operating system. The operating system scans the free list using a pointer while allocating free system memory space at run-time. The system memory pages are allocated from the free list until the pointer reaches a conflict page. This allows the operating system to prevent the conflict pages from getting cached to the hot page location within the cache memory.

U.S. Pat. No. 6,408,364 describes an apparatus and method for implementing a least recently used (LRU) cache replacement algorithm with a set of N pointer registers that point to respective ways of an N-way set of memory blocks. One of the pointer registers is an LRU pointer, pointing to a least recently used way and another of the pointer registers is a most recently used (MRU) pointer, pointing to a most recently used way. For a cache fill operation in which a new memory block is written to one of the N ways, the new memory block is written into the way ($way_n$) pointed to by the LRU pointer. All the pointers except the MRU pointer are promoted to point to a way pointed to by respective newer neighboring pointers, the newer neighboring pointers being neighbors toward the MRU pointer.

U.S. Pat. No. 6,347,364 discloses schedulable dynamic memory pinning. An application submits a request for pinning its memory for a certain duration. As compensation, the application may offer other currently mapped pages for replacement. The request may also include the number of pages and the duration of time. The request is granted with the constraint policies which the application is to follow. Such constraint policies include number of pages and length of time the pages may remain pinned in memory. When compensation pages are offered, those pages are replaced in place of the pages which are granted the privilege of being pinned.

U.S. Pat. No. 5,897,660 discloses a method for managing free physical pages that reduces trashing to improve system performance, wherein the claimed invention overcomes the drawbacks of conventional operating system implementations of virtual to physical memory address mapping by providing a method for free physical page management and translation of virtual addresses to physical addresses that increase the effectiveness of the cache memory by reducing the thrashing caused by unfavorable mapping of virtual to physical addresses.

U.S. Pat. No. 5,809,563 discloses a method and apparatus for translating a virtual address into a physical address in a multiple region virtual memory environment. A translation lookaside buffer (TLB) is configured to provide page table entries to build a physical address. The TLB is supplemented with a virtual hash page table (VHPT) to provide TLB entries in the occurrence of TLB misses.

Transaction systems prefetch pages in anticipation of these pages being referenced in the future. Current systems would prefetch pages that are in some multiple of pages adjacent to the current one being processed. Other mechanisms include using an index which forms an ordered list of page references, which can be used to prefetch pages to be examined. The following references provide for a general teaching with regard to prefetching, but they fail to provide for the claimed invention's robust method and system of prefetching in ordered nodes wherein the nodes are ordered into isolated regions.

U.S. patent application publication 2002/0103778 discloses a method and system for adaptive prefetching. A cache server may prefetch one or more web pages from an origin server prior to those web pages being requested by a user. The cache server determines which web pages to prefetch based on a graph associated with a prefetch module associated with the cache server. The graph represents all or a portion of the web pages at the origin server using one or more nodes and one or more links connecting the nodes. Each link has an associated transaction weight and user weight.

U.S. patent application publication 2002/0078165 discloses a system and method for prefetching portions of a web page based on learned preferences. A system and a method for prefetching portions of a web page is based on preferences learned from previous visits to the web page. The disclosed prefetching technique determines whether a user prefers certain sub-pages of the web page and, if so, prefetches these preferred sub-pages prior to the other sub-pages of the web page. The set of preferred sub-pages is generated by analyzing the user's actions during previous visits to the web page.

U.S. Pat. No. 6,385,641 discloses an adaptive prefetching method for use in a computer network and web browsing. The prefetching scheme consists of two modules: a prediction module and a threshold module. After a user's request for a new file is satisfied, the prediction module immediately updates a database of history information, if needed, and computes the access probability for each candidate file where the access probability of a file is an estimate of the probability with which that file will be requested by the user in the near future. Next, the threshold module determines the prefetch threshold for each related server which contains at least one candidate file with nonzero access probability. The threshold is determined in real time based on then current network conditions. Finally, each file whose access probability exceeds or equals its server's prefetch threshold is prefetched. When prefetching a file, the file is actually downloaded if and only if no up-to-date version of the file is available on the local computer; otherwise, no action is taken.

U.S. Pat. No. 6,085,193 discloses a method and system for dynamically prefetching information via a server hierarchy. The method for prefetching data identifies data access patterns and prefetches select information based on dynamic interpretation of the data access patterns. The content server or proxy server identifies data access reference patterns of clients associated with the content server or the proxy server hierarchy. The decision to prefetch select information for the clients is made based on prefetch hint information and prefetch hint values.

U.S. Pat. No. 6,081,799 discloses a method for executing complex SQL queries using index screening for conjunct or disjunct index operations. A query is executed to access data stored on a data storage device connected to a computer. In particular, while accessing one or more indexes to retrieve row identifiers, index matching predicates in the query are applied to select row identifiers and index screening predicates in the query are applied to eliminate one or more selected row identifiers.

U.S. Pat. No. 6,067,565 discloses a technique for prefetching a web page of potential future interest in lieu of continuing a current information download. Described within is a technique that, through continual computation, harnesses available computer resources during periods of low processing activity and low network activity, such as idle time, for prefetching, e.g., web pages or pre-selected portions thereof, into the local cache of a client computer.

U.S. Pat. No. 6,026,474 discloses shared client-side web caching using globally addressable memory. A shared client-side Web cache is provided by implementing a file system shared between nodes. Each browser application stores cached data in files stored in a globally addressable data store. Since the file system is shared, the client-side Web caches are also shared.

Whatever the precise merits, features, and advantages of the above-cited references, none of them achieves or fulfills the purposes of the present invention.

SUMMARY OF INVENTION

The present invention provides a system and method for prefetching and replacing pages in storage, wherein the storage retains a plurality of pages and each of the pages comprising a plurality of nodes grouped into one or more regions. The system and method are accomplished via a bufferpool, a prefetcher, and a page replacer. The bufferpool stores a variable set of pages in memory. The prefetcher recognizes access patterns and usage and fetches pages among the plurality of pages that fit the access patterns and usage. Further, the page replacer works in conjunction with the bufferpool and, during a traversal, weights the variable set of pages to identify a subset to be retained and a remainder to be replaced, wherein the subset includes pages having a high probability of being revisited. The remainder is replaced with a page corresponding to the traversal. Weighting is based upon at least the following numerical values associated with each page in said variable set of pages: number of children, number of parents, and region statistics. The region statistics are any of, or a combination of, the following: minimum step, minimum level, maximum step, or maximum level.

In an extended embodiment, weighting is additionally based upon identifying pivot pages that define traversals that are not strictly parent-to-child or child-to-parent.

In another embodiment, the plurality of nodes are associated with a mark-up language based document, such as XML.

In yet another embodiment, the system and the method are implemented across networks, wherein the across network element is any of the following: local area network (LAN), wide area network (WAN), the Internet, cellular network, or wireless network.

BRIEF DESCRIPTION OF DRAWINGS

FIGS. 5a–c illustrate differing sets of regions formed from a representative XML document.

DESCRIPTION OF THE PREFERRED EMBODIMENTS

Figure 1:
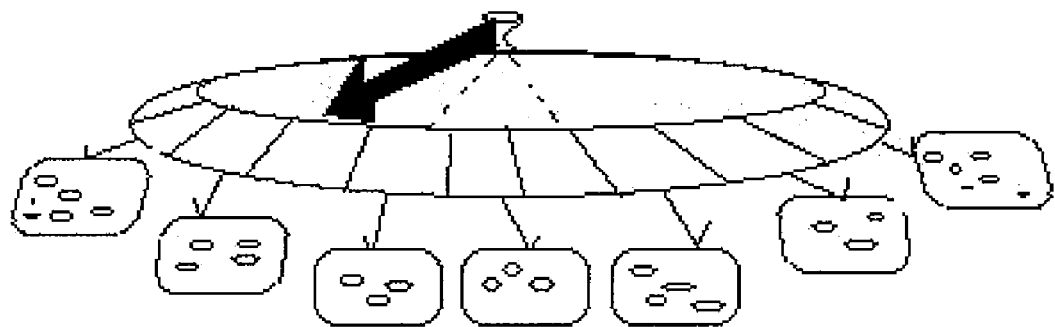
FIGS. 1–2 illustrate prior art buffer pool managers.
Figure 2:
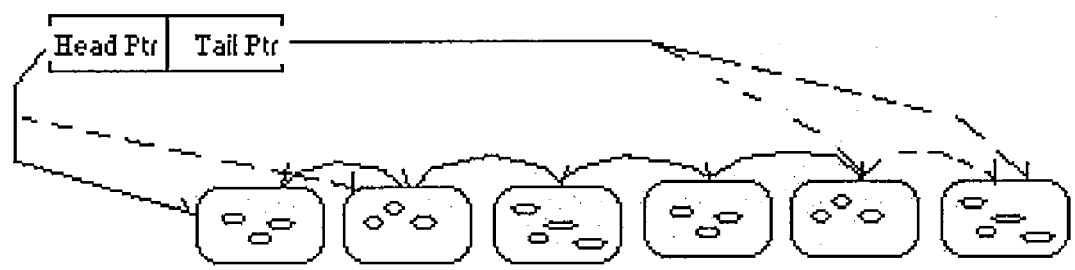

While this invention is illustrated and described in a preferred embodiment, the invention may be produced in many different configurations. There is depicted in the drawings, and will herein be described in detail, a preferred embodiment of the invention, with the understanding that the present disclosure is to be considered an exemplification of the principles of the invention and the associated functional specifications for its construction and is not intended to limit the invention to the embodiment illustrated. Those skilled in the art will envision many other possible variations within the scope of the present invention.

The present invention presents a robust system and method for prefetching and replacing pages in an ordered node structure, wherein the node structure is representative of hierarchical data associated with a document and the ordering is based on the concept of isolated ordered regions. The coordinates of nodes are maintained by associating each node with coordinates relative to a containing region. Modifications to nodes within a region only affect the nodes in that region—not nodes in other regions. Traversals that retrieve information from the nodes can rebase the coordinates from their containing region and return results with a total order.

Figure 3:
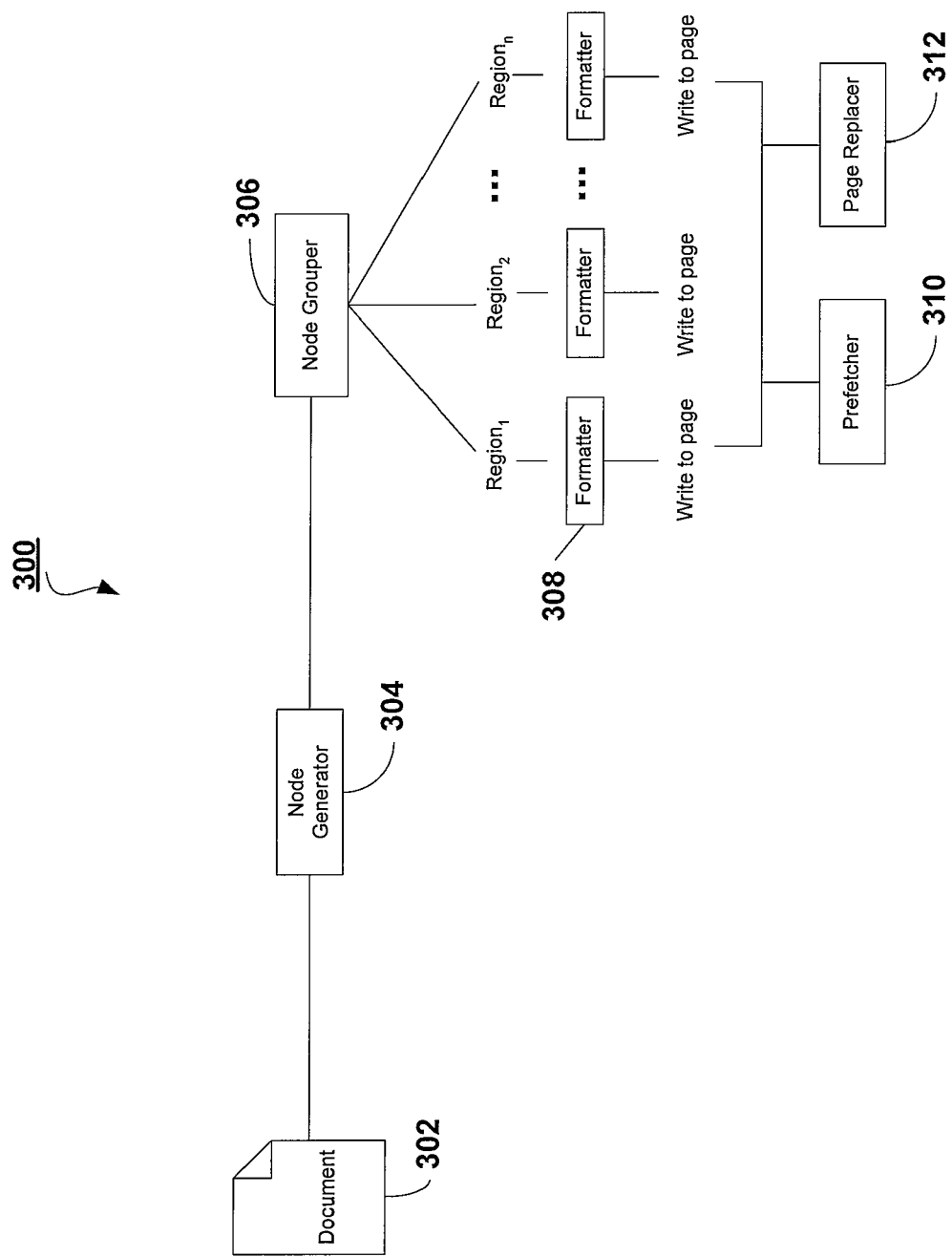
FIG. 3 illustrates an overview of the system of the present invention.
Figure 4:
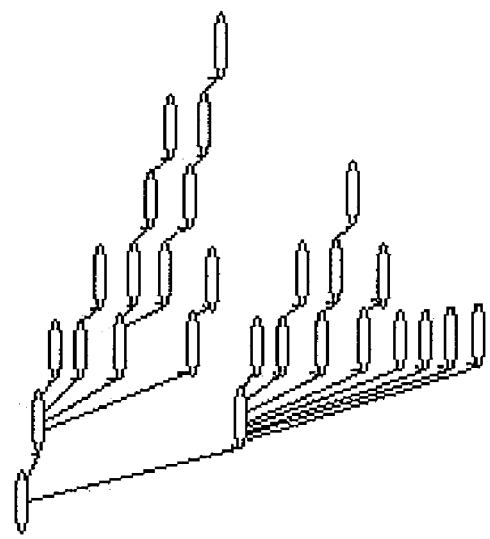
FIG. 4 illustrates how, in a specific example, nodes from an XML document are extracted.
Figure 4:
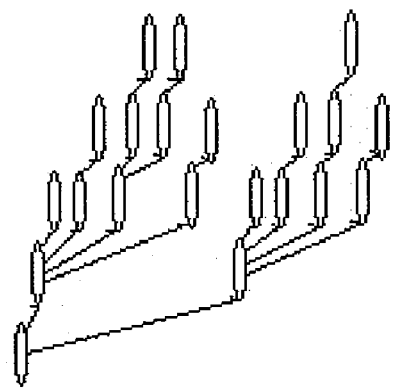

FIG. 3 illustrates an overview of the node ordering system 300 used in conjunction with the present invention. Document 302, containing hierarchical data (e.g., a document in a mark-up language-based format such as XML) is stored by creating nodes, via node generator 304, that parse and represent the entities of the document and the relationships that exist among the entities. The nodes are grouped into regions (i.e., Region $R_1$ through $R_n$) via region grouper 306 and are formatted, via formatter 308, and written out to pages. As the nodes are created, they are grouped into regions in various ways depending upon anticipated access patterns and usage. Each region is formatted and stored into pages managed by the system. The present invention's prefetcher 310 recognizes access patterns and usage and fetches pages that fit the recognized patterns. The present invention's page replacer 312 works in conjunction with a bufferpool and identifies the probability of revisiting traversed nodes, wherein the page replacer replaces pages (in bufferpool) with least probability of being revisited. There can be more than one region written to a page. FIG. 4 illustrates how, in a specific example, nodes from an XML document 400 are extracted.

It should be noted that although throughout the figures and specification an XML document has been used to illustrate various examples, other hierarchically-ordered documents, such as documents in mark-up language formats such HTML, can be equally used in conjunction with the present invention. Therefore, the scope of the present invention should not be limited by the type of hierarchically-ordered document.

FIGS. 5a–c illustrate differing sets of regions formed from a representative XML document 400. In this example, a set of nodes representative of an XML document can be broken, in FIG. 5a, into three regions 502, 504, and 506.

Figure 6B:
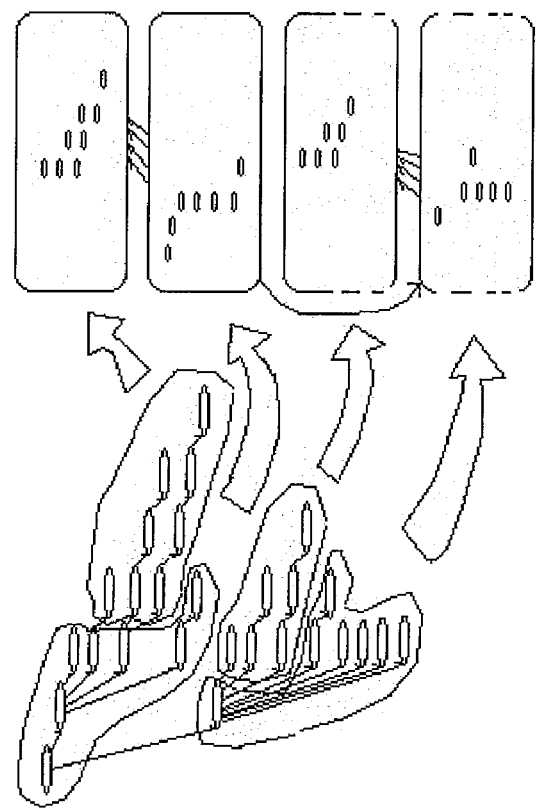
FIGS. 6a and 6b illustrate regions as defined in FIGS. 5a and 5b, ordered and stored in pages.
Figure 6A:
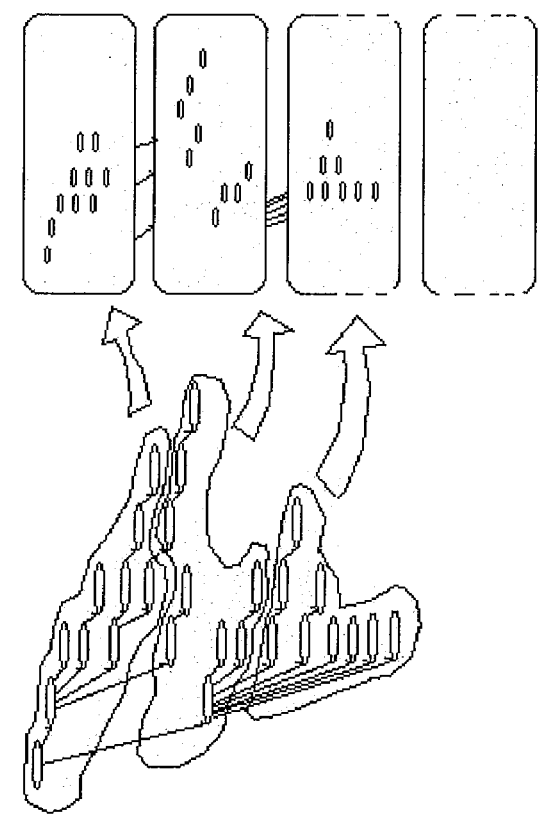

Similarly, in FIGS. 5b and 5c, the same set of nodes is broken into regions 508–514 and 516–524, respectively. FIGS. 6a and 6b illustrate the next stage, wherein the regions as defined in FIGS. 5a and 5b are ordered and stored in pages.

Each region has a number of values associated with it wherein these values are computed using algorithms, to be outlined later. Each region has a Minimum Step (Min Step), Minimum Level (Min Level), Maximum Step (Max Step), Maximum Level (Max Level), and Step Range. The Min Step, Min Level, Max Step, and Max Level numbers give a region its dimensions and order within the document.

Figure 7B:
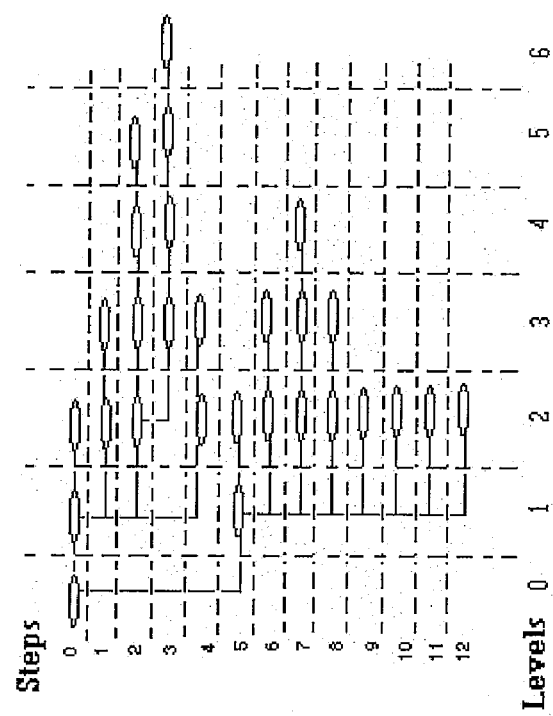
FIGS. 7a and 7b illustrate a specific example depicting the mapping of nodes in a hierarchically structured document, based upon steps and levels.
Figure 7A:
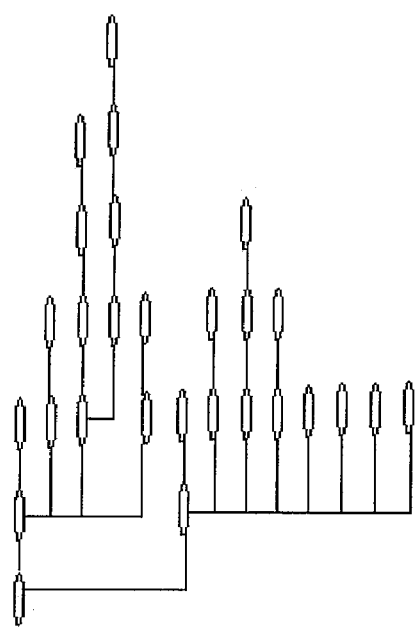

FIGS. 7a and 7b illustrate a specific example depicting the mapping of nodes in a hierarchically-structured document based upon steps and levels. The following algorithm, based on a set of rules, is used in such a mapping:

For every descendant
Level=Level+1
For every ancestor
Level=Level−1
For every [>1st] child node
Step=Step+1

Figure 8:
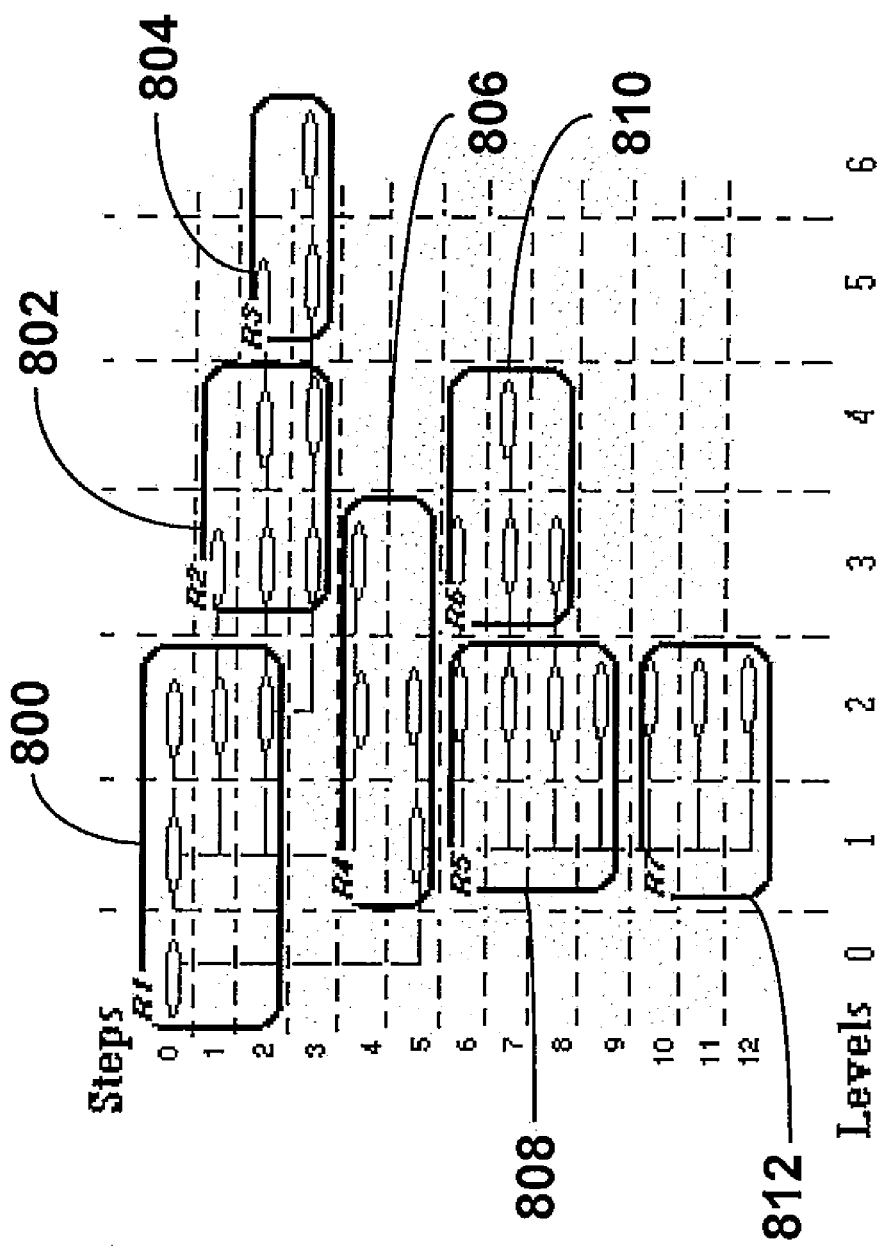
FIG. 8 illustrates mapped nodes that are grouped in a plurality of regions, i.e., R1, R2, R3, R4, R5, R6, and R7.

Next, as in FIG. 8, the mapped nodes are grouped in a plurality of regions: R1 800, R2 802, R3 804, R4 806, R5 808, R6 810, and R7 812. Specific grouping patterns are used for illustrative purposes only, and it should noted that other groupings of the same set of nodes are envisioned (as illustrated in FIGS. 5a–c) in conjunction with the present invention. Also, as mentioned earlier, specific groupings of regions can depend on anticipated access patterns and usage.

The regions of FIG. 8 are ordered based on ascending Min Step and ascending Min Level. Table 1, provided below, depicts a list of regions ordered based upon ascending Min Step and Min Levels.

TABLE 1

|    | Nesting Level | Min Step | Min Level | Max Step | Max Level |
|----|---------------|----------|-----------|----------|-----------|
| R1 | 0             | 0        | 0         | 2        | 2         |
| R2 | 0             | 1        | 3         | 3        | 4         |
| R3 | 0             | 2        | 5         | 3        | 6         |
| R4 | 0             | 4        | 1         | 5        | 3         |
| R5 | 0             | 6        | 2         | 9        | 2         |
| R6 | 0             | 6        | 3         | 8        | 4         |
| R7 | 0             | 10       | 2         | 12       | 2         |

Regions are then grouped into Step Ranges. Regions within a Step Range have Min Step and Max Step values that do not overlap with that of regions in other Step Ranges. The algorithm below illustrates how to compute the Step Ranges in a set of regions:

LET POT#=Post Order Traversal Number
  LEVEL=Node Level Coordinate
  STEP=Node Step Coordinate
FOR EVERY Node N1 AND Node N2
IF (N1 POT#>N2 POT#) AND
  (N1 LEVEL<N2 LEVEL) AND
  (N1 STEP<=N2 STEP)
THEN
N1 CONTAINS N2

Table 2, provided below, depicts Step Ranges (calculated based upon the above-mentioned algorithm) of regions of FIG. 8 and Table 1.

TABLE 2

| Region (Parameters) | Step Ranges |
|---------------------|-------------|
| R1[0, 0, 0, 2, 2]   | 0           |
| R2[0, 1, 3, 3, 4]   | 0           |
| R3[0, 2, 5, 3, 6]   | 0           |
| R4[0, 4, 1, 5, 3]   | 4           |
| R5[0, 6, 2, 9, 2]   | 6           |

TABLE 2-continued

| Region (Parameters) | Step Ranges |
|---------------------|-------------|
| R6[0, 6, 3, 8, 4]   | 6           |
| R7[0, 10, 2, 12, 2] | 10          |

Figure 9:
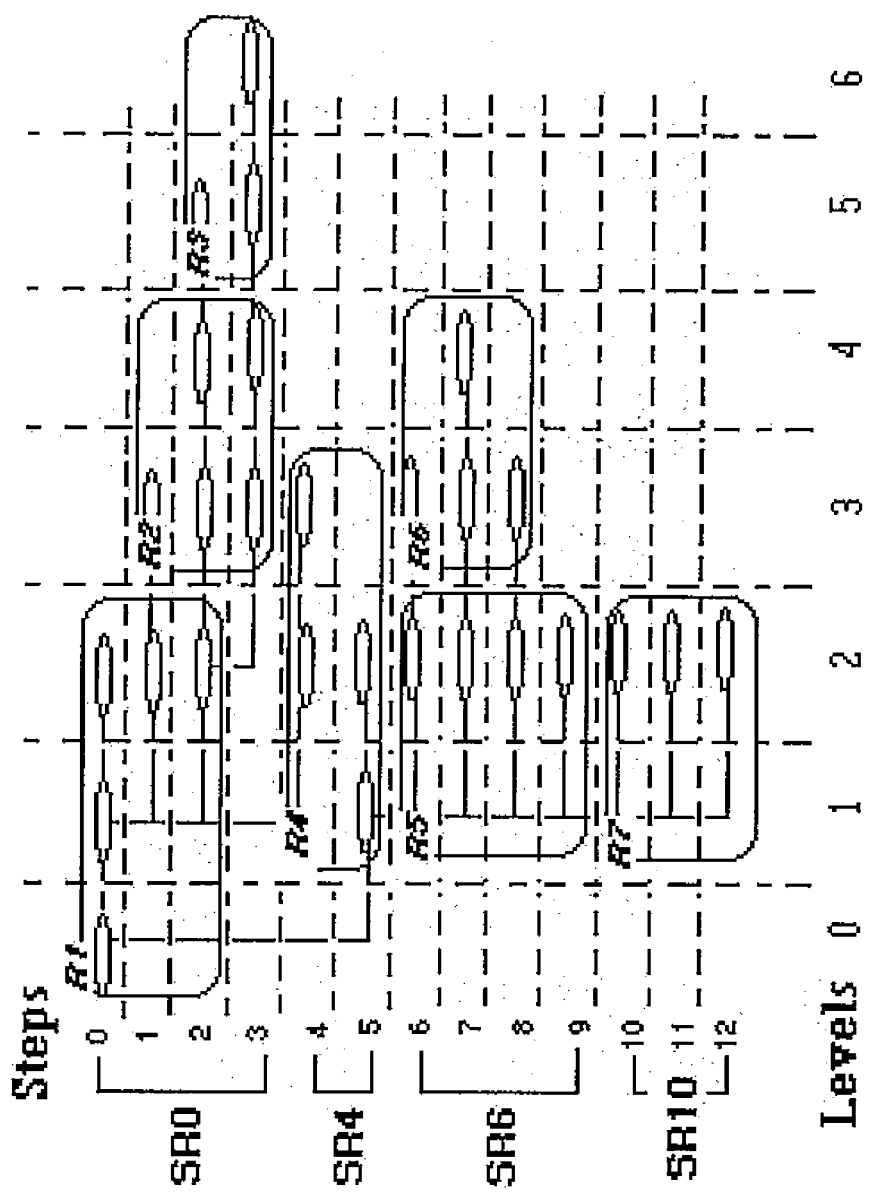
FIG. 9 illustrates the relationships among the calculated step ranges and the various regions of FIG. 8.

The relationship among the calculated Step Ranges and the various regions of FIG. 8 (i.e., R1 800, R2 802, R3 804, R4 806, R5 808, R6 810, and R7 812) are shown in FIG. 9. In FIG. 9, SR6 represents regions that have a step range equal to 6, which in this case encompasses regions R5 (808 of FIG. 8) and R6 (810 of FIG. 8).

Figure 10:
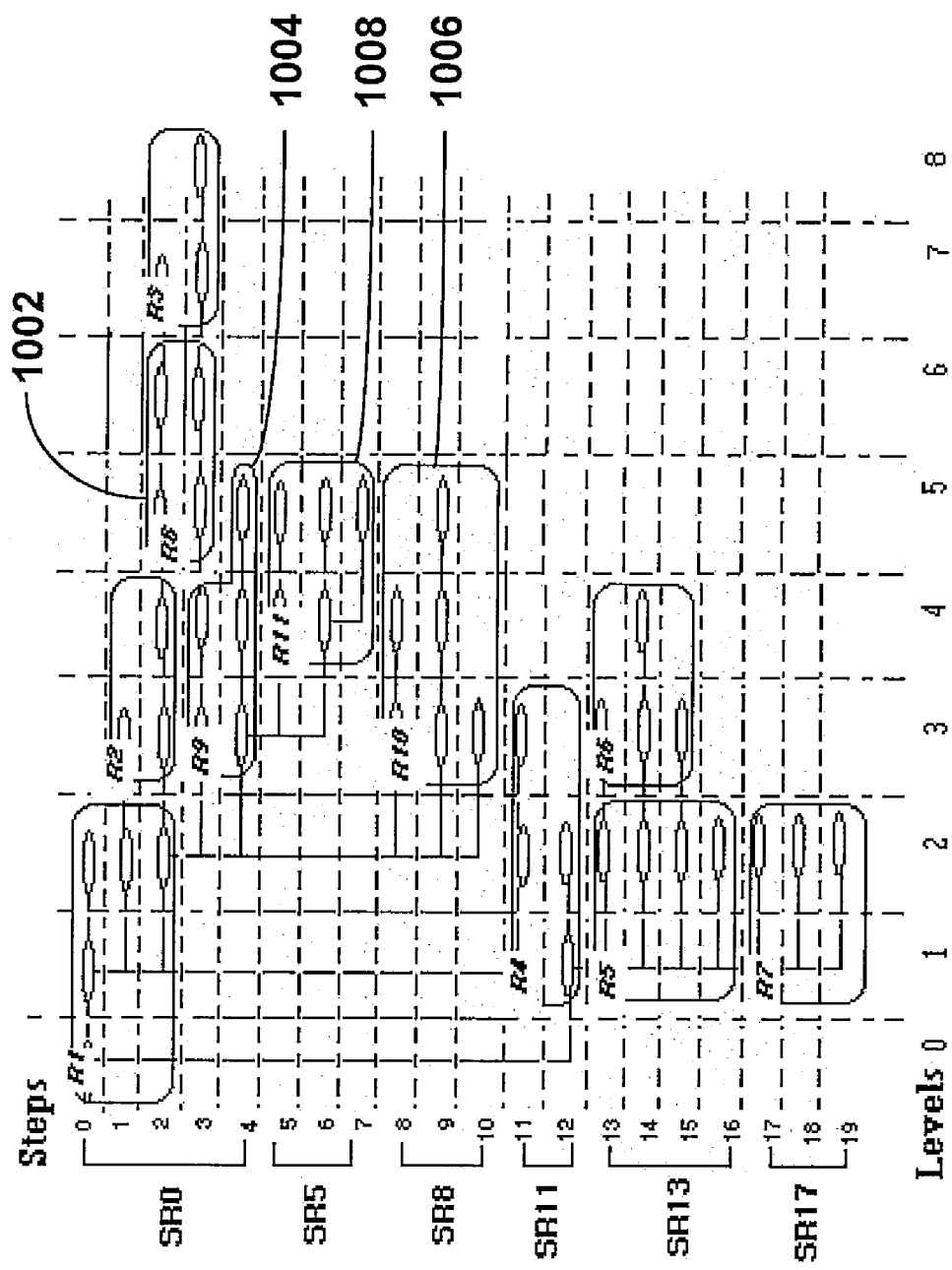
FIG. 10 illustrates an example that represents a variation of the example illustrated in FIG. 8, wherein the variation represents added nodes (and, therefore, added regions).

FIG. 10 illustrates an example that represents a variation of the example illustrated in FIG. 8, wherein the variation represents added nodes (and therefore, added regions). In addition to the regions of FIG. 8, FIG. 10 further includes regions R8 1002, R9 1004, R10 1006, and R11 1008. The addition of these regions (R8–R11) changes the Step Ranges associated with all regions depicted in FIG. 10. Table 3, provided below, depicts Step Ranges (calculated based upon the above-mentioned algorithm) of regions of FIG. 10.

TABLE 3

| Region (Parameters)  | Step Ranges |
|----------------------|-------------|
| R1[0, 0, 0, 2, 2]    | 0           |
| R2[0, 1, 3, 2, 4]    | 0           |
| R8[0, 2, 5, 3, 6]    | 0           |
| R3[0, 2, 7, 3, 8]    | 0           |
| R9[0, 3, 3, 4, 5]    | 0           |
| R11[0, 5, 4, 7, 5]   | 5           |
| R10[0, 8, 3, 10, 5]  | 8           |
| R4[0, 11, 1, 12, 3]  | 11          |
| R5[0, 13, 2, 16, 2]  | 13          |
| R6[0, 13, 3, 15, 4]  | 13          |
| R7[0, 17, 2, 19, 2]  | 17          |

Figure 11:
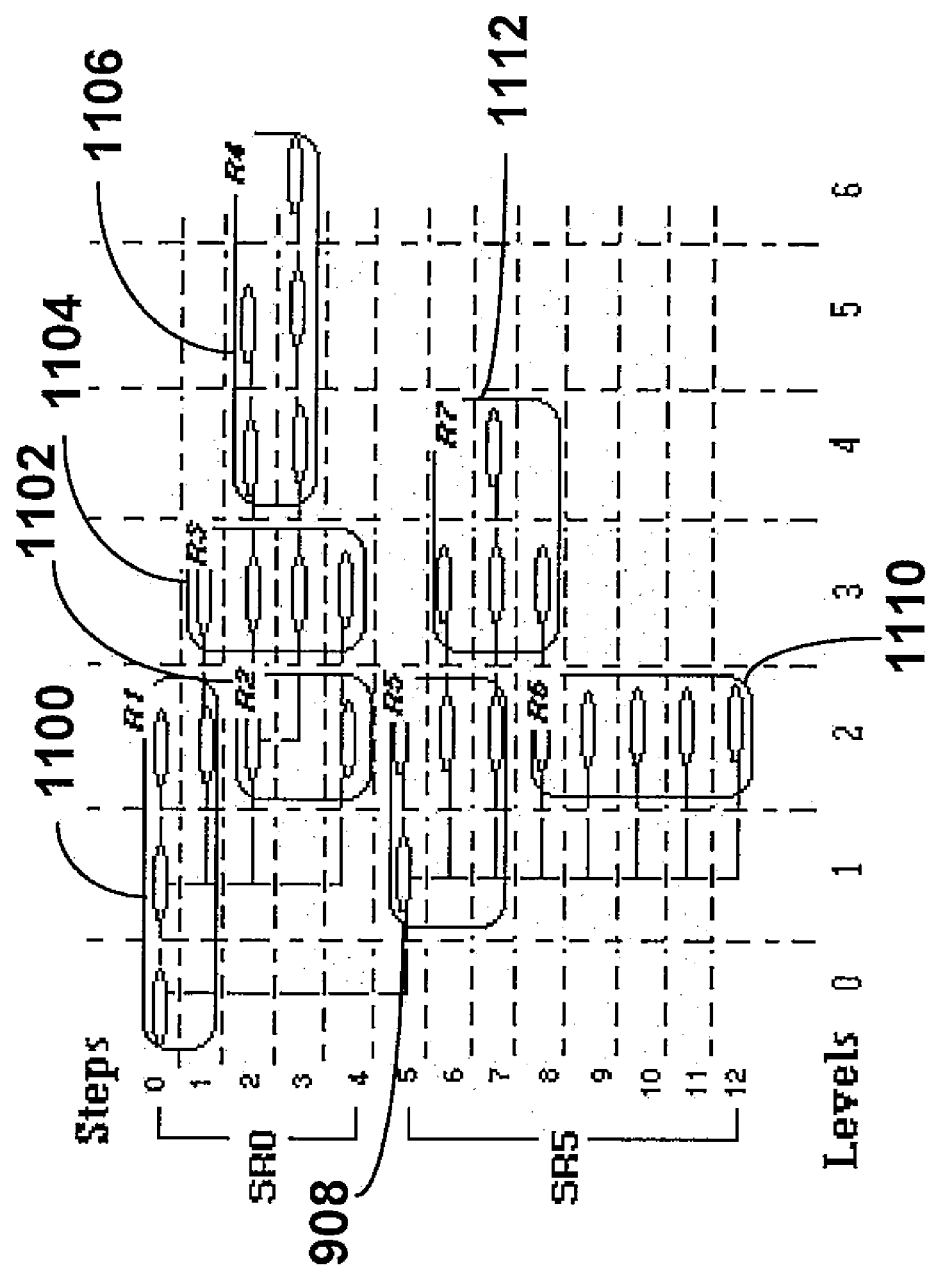
FIG. 11 illustrates an example that represents another variation of the example illustrated in FIG. 8, wherein the variation represents different ordering of regions using the same set of nodes.

FIG. 11 illustrates an example that represents another variation of the example illustrated in FIG. 8, wherein the variation represents different ordering of regions using the same set of nodes. The new set of regions of FIG. 11 includes: R1 1100, R2 1102, R3 1104, R4 1106, R5 1108, R6 1110, and R7 1112. The regions of FIG. 11 are ordered based upon ascending Min Step and ascending Min Level. Table 4, provided below, depicts a list of regions of FIG. 11 ordered based upon ascending Min Step and Min Levels.

TABLE 4

|    | Nesting Level | Min Step | Min Level | Max Step | Max Level |
|----|---------------|----------|-----------|----------|-----------|
| R1 | 0             | 0        | 0         | 1        | 2         |
| R3 | 0             | 1        | 3         | 4        | 3         |
| R2 | 0             | 2        | 2         | 4        | 2         |
| R4 | 0             | 2        | 4         | 3        | 6         |
| R5 | 0             | 5        | 1         | 7        | 2         |
| R7 | 0             | 6        | 3         | 8        | 4         |
| R6 | 0             | 8        | 2         | 12       | 2         |

Once the Step Ranges are determined, the regions are re-ordered. The previous entries ordered based on Min Step, Min Level are now ordered based on Step Range, Min Level, Min Step. In the above example, regions R2 902, R3 904, R6 910, and R7 912 are reordered. This change accurately reflects the parent-child relationship of the regions within a Step Range. Table 5, provided below, depicts a list of regions of FIG. 11 reordered based upon Step Range, Min Levels, Min Step:

TABLE 5

| Nesting Level | Min Step | Min Level | Max Step | Max Level |
|---|---|---|---|---|
| R1 | 0 | 0 | 0 | 1 | 2 |
| R3 | 0 | 1 | 3 | 4 | 3 |
| R2 | 0 | 2 | 2 | 4 | 2 |
| R4 | 0 | 2 | 4 | 3 | 6 |
| R5 | 0 | 5 | 1 | 7 | 2 |
| R7 | 0 | 6 | 3 | 8 | 4 |
| R6 | 0 | 8 | 2 | 12 | 2 |

Figure 12:
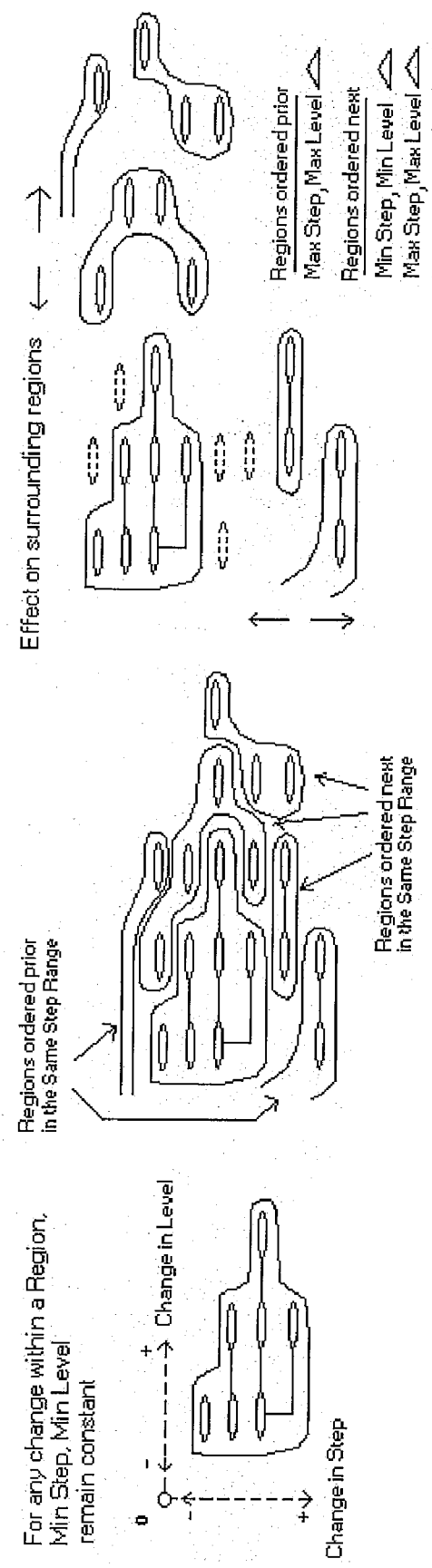
FIG. 12 illustrates changes in parameters of regions due to changes in node structure.

FIG. 12 illustrates changes in parameters of regions due to changes in node structure. When nodes added to or deleted from a region(s) are added to or deleted from a document, the Step Range, Min Level, Min Step, Max Level, and Max Step values of neighboring regions are affected.

For regions in the same Step Range, retraversal of the regions needs to be performed to recompute the Min Level, Min Step, Max Level, and Max Step values. For regions in Step Ranges that follow, only the Min Step and Max Step values need adjustment.

To defer retraversal of regions during modifications, regions affected can be assigned to another nesting level. When this happens, the original set of regions retains its dimensions with respect to other regions in the same nesting level, while a new set of regions with a higher nesting level is created.

Figure 13:
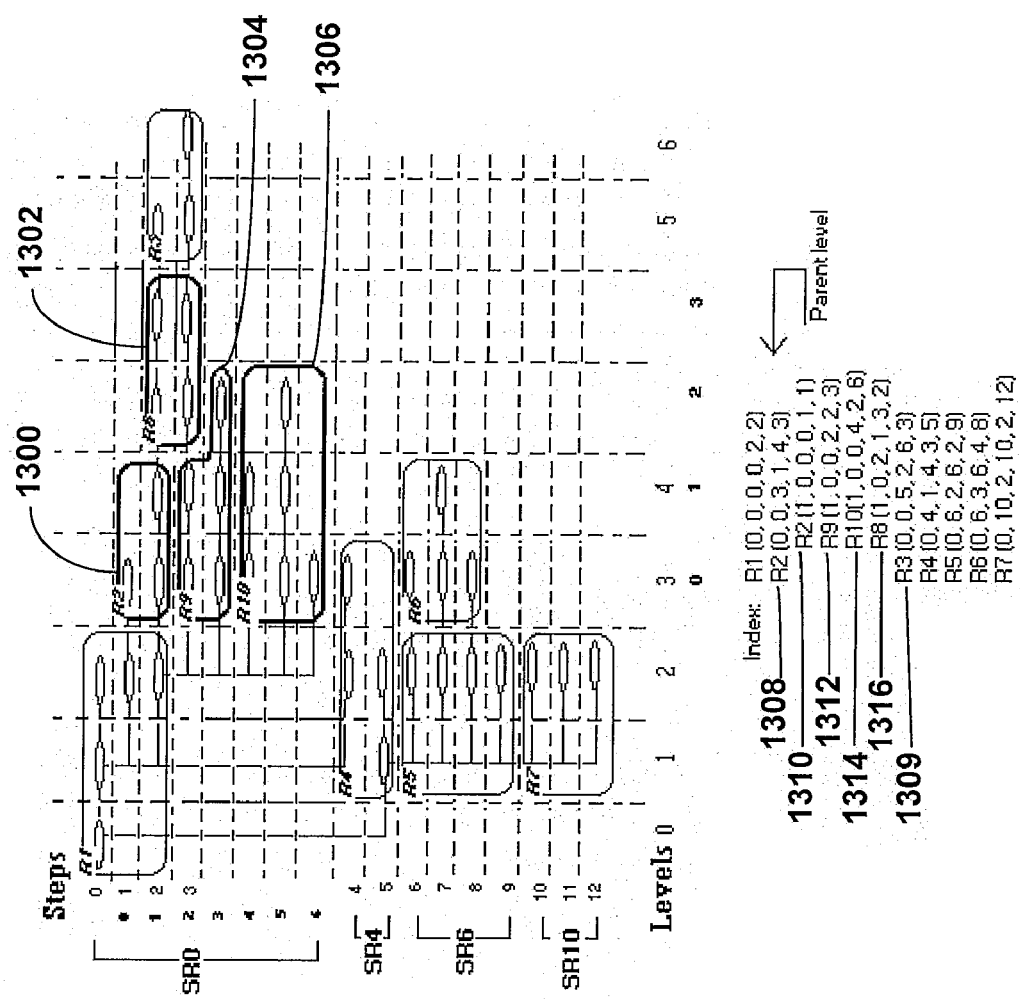
FIG. 13 illustrates the effect of the addition of nodes.

For example, as shown in FIG. 13, nodes were added to region R2 of FIGS. 8 and 9 which modified its dimensions and caused other regions R2 (of nesting level 1) 1300, R8 1302, R9 1304, and R10 1306 to be created. The index used to maintain the order of the regions still preserves the order of R2 1308 with respect to R3 1309 in nesting level 0, but now R2 1310, R9 1312, R10 1314, and R8 1316 of nesting level 1 are ordered in-between (shown as tabbed entries in FIG. 13).

The regions of the new nesting level have Min Level, Min Step, Max Level, and Max Step values that are computed with respect to their parent nesting level region. For example, R8 1316 in nesting level 1 is two levels and one step away from the axis of R2 1308 in nesting level 0. It should be noted that, in FIG. 13, the axis of R2 1300 starts off a new Step count (from 0 to 6) and a new Level count (from 0 to 3) in nesting level 1.

Figure 14:
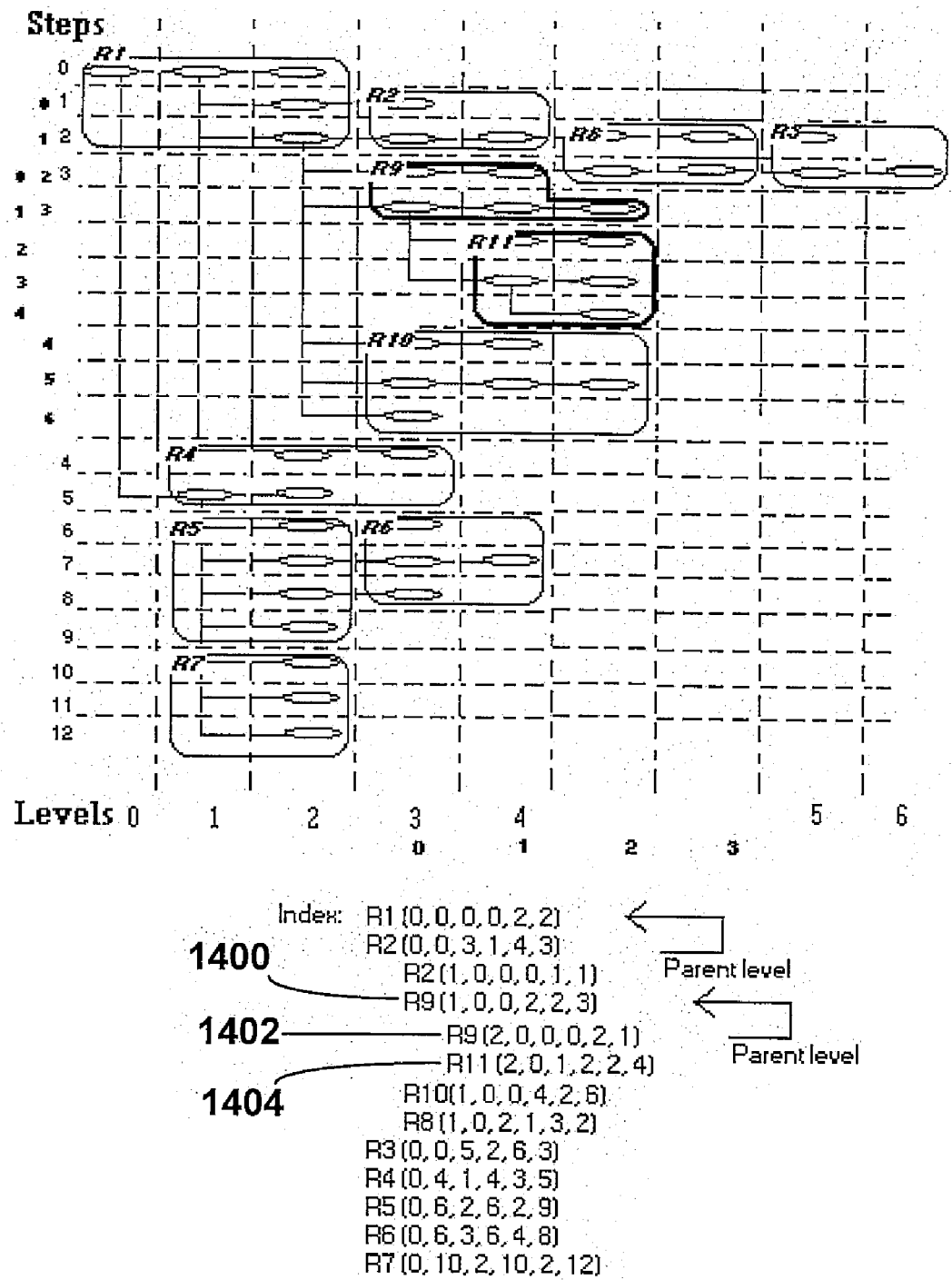
FIG. 14 illustrates the effect of nesting levels on various mapped regions.

Further modifications to the document cause more regions of higher nesting levels to be created, all based of a parent level region. For example, as illustrated in FIG. 14, R9 of nesting level 1 1400 grows, causing R9 1402 and R11 1404 of nesting level 2 to be created. Again, it should be noted that regions in ancestor nesting levels do not change.

Figure 15:
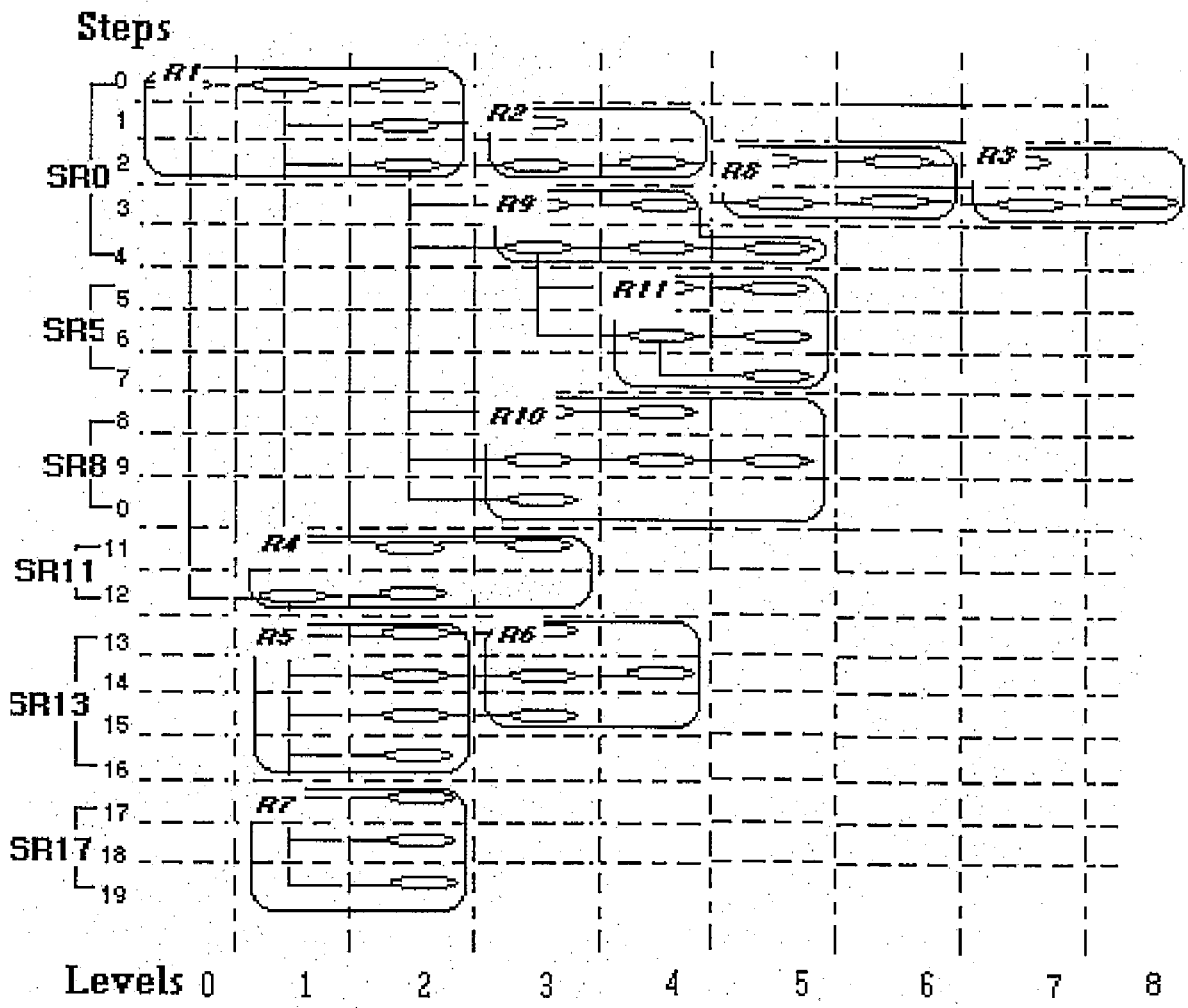
FIG. 15 illustrates reordering of regions of the document.

After the retraversal of regions within the Step Range and the adjustment of Min Step and Max Step values of the regions in the Step Ranges that follow, the regions of the document will be reordered, as shown in FIG. 15.

Figures 16A, 16B:
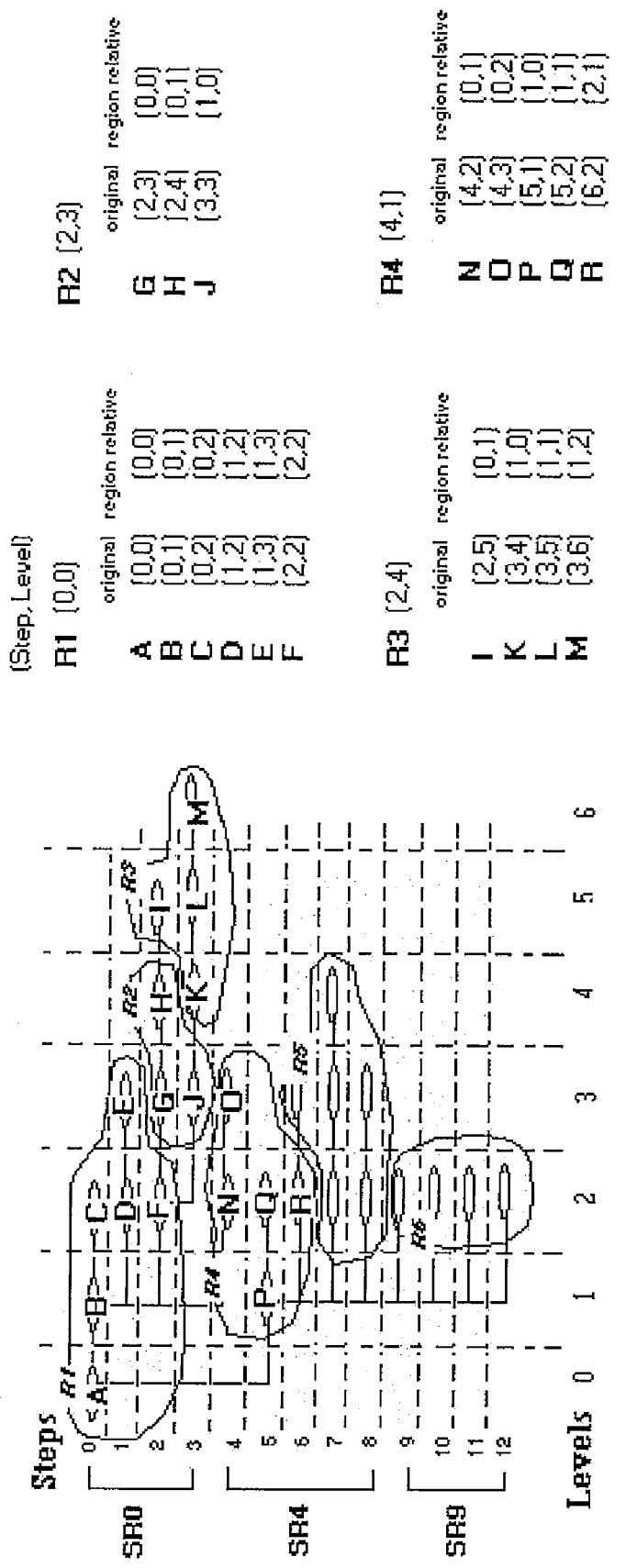
FIGS. 16a–b illustrate original and region-relative coordinates associated with nodes in various regions.

Traversals that extract information from nodes require an order for each of the nodes in the document. Step and Level values can be associated with each of the nodes to impose an order for all nodes. These values are computed relative to the Step and Level values of the containing region. Modifications in the document only affect the region coordinates which are maintained in a Region Index—not the node coordinates. In the example illustrated in FIG. 16a, the coordinate of the H node in Region R2 with Step 2, Level 3 is Step 0, Level 1 relative to the region. Therefore, H nodes" absolute coordinate is Step 2, Level 4. FIG. 16b illustrates original and region-relative coordinates associated with nodes in Regions R1–R4.

Figure 17:
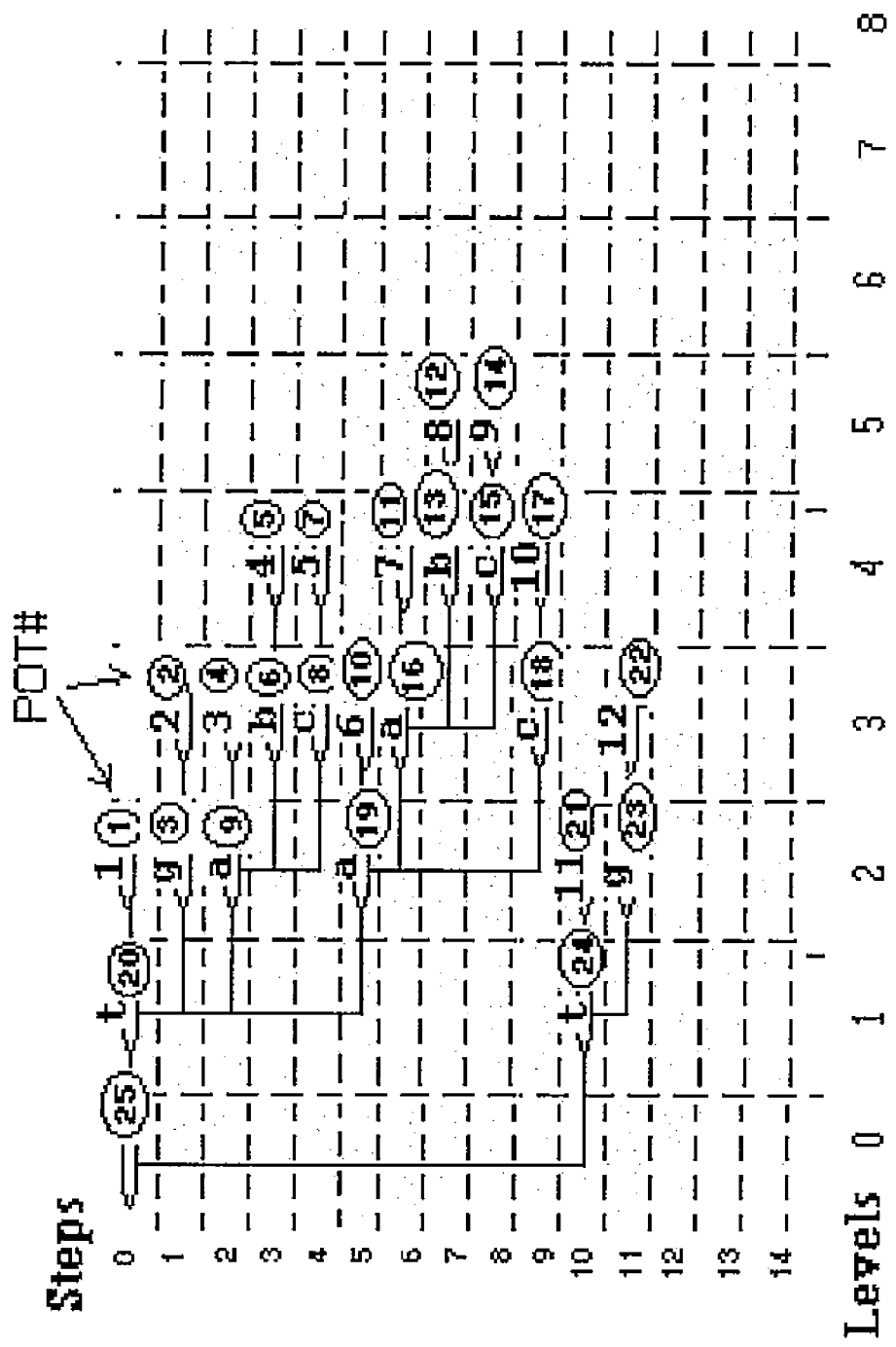
FIG. 17 illustrates a scenario wherein post order traversal (POT#) numbers can be computed for each of the nodes during traversal to identify containment relationships among nodes.

FIG. 17 illustrates a scenario wherein post-order traversal (POT#) numbers can be computed for each of the nodes during traversal to identify containment relationships among nodes. Given the Step, Level, and POT# values of two nodes, the system can determine whether one node contains the other node. In the example below, the node with Step 5, Level 2, POT# 19 contains the node with Step 7, Level 4, POT# 13; but the node with Step 10, Level 1, POT# 24 does not contain the node with Step 7, Level 4, POT# 13. The algorithm for identifying if a node N1 contains another node N2 is given below:

LET POT#=Post Order Traversal Number
   LEVEL=Node Level Coordinate
   STEP=Node Step Coordinate
FOR EVERY Node N1 AND Node N2
IF (N1 POT#>N2 POT#) AND
   (N1 LEVEL<N2 LEVEL) AND
   (N1 STEP<=N2 STEP)
THEN
N1 CONTAINS N2

TABLE 5

| Nesting Level | Min Step | Min Level | Max Step | Max Level |
|---|---|---|---|---|
| R1 | 0 | 0 | 0 | 1 | 2 |
| R3 | 0 | 1 | 3 | 4 | 3 |
| R2 | 0 | 2 | 2 | 4 | 2 |
| R4 | 0 | 2 | 4 | 3 | 6 |
| R5 | 0 | 5 | 1 | 7 | 2 |
| R7 | 0 | 6 | 3 | 8 | 4 |
| R6 | 0 | 8 | 2 | 12 | 2 |

It should be noted that although algorithms identified above (e.g., in the discussions of FIG. 7a–7b) are based on a set of rules associated with how steps are computed, other variations of computing steps are also within the scope of the invention. For example, the algorithm described in relation to FIG. 7a–b has problems with updates, as it could move nodes from one region out into another region during updates. For example, if the document were a, b, c, and d, where a->b, and b->c and b->d, then a, b, and c would be assigned step 0 and d assigned step 1; but during updates, if c were removed, d would need to be moved up one step, potentially into a different region from where it was originally. A simpler way of "counting" steps is to monotonically increase the step number every time a child node is descended. That is, if the document is a->b->c, b->d, a->e, then the step numbering would be a (1), b (2), c (3), d (4), e (5). This step numbering scheme is the same as that for preorder traversal of a tree of nodes and is illustrated in FIGS. 16a–f.

Figure 18B:
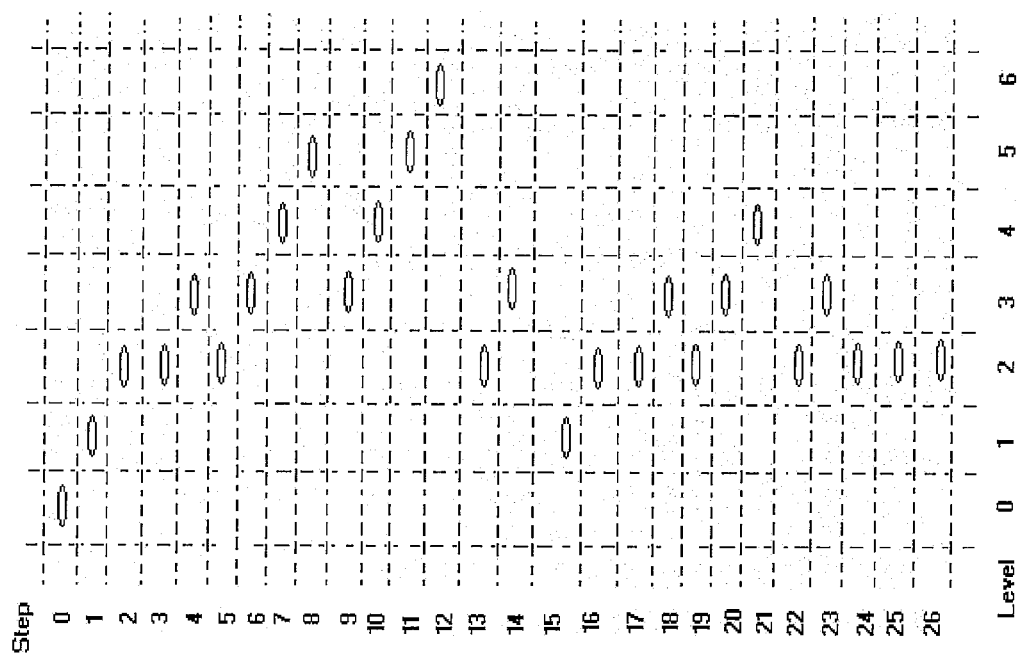
FIGS. 18a–b illustrate a set of nodes and their respective mapping based on the method of assigning a step number every time a child node is descended.
Figure 18A:
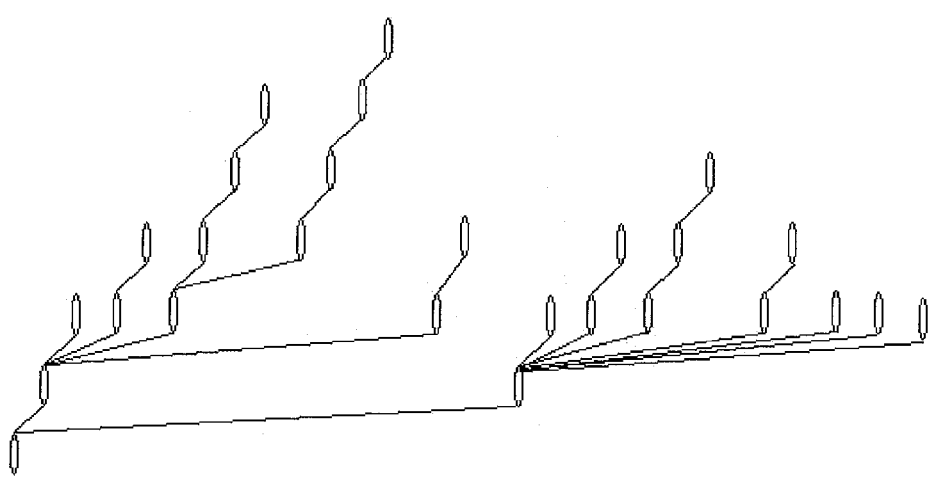
Figure 18C:
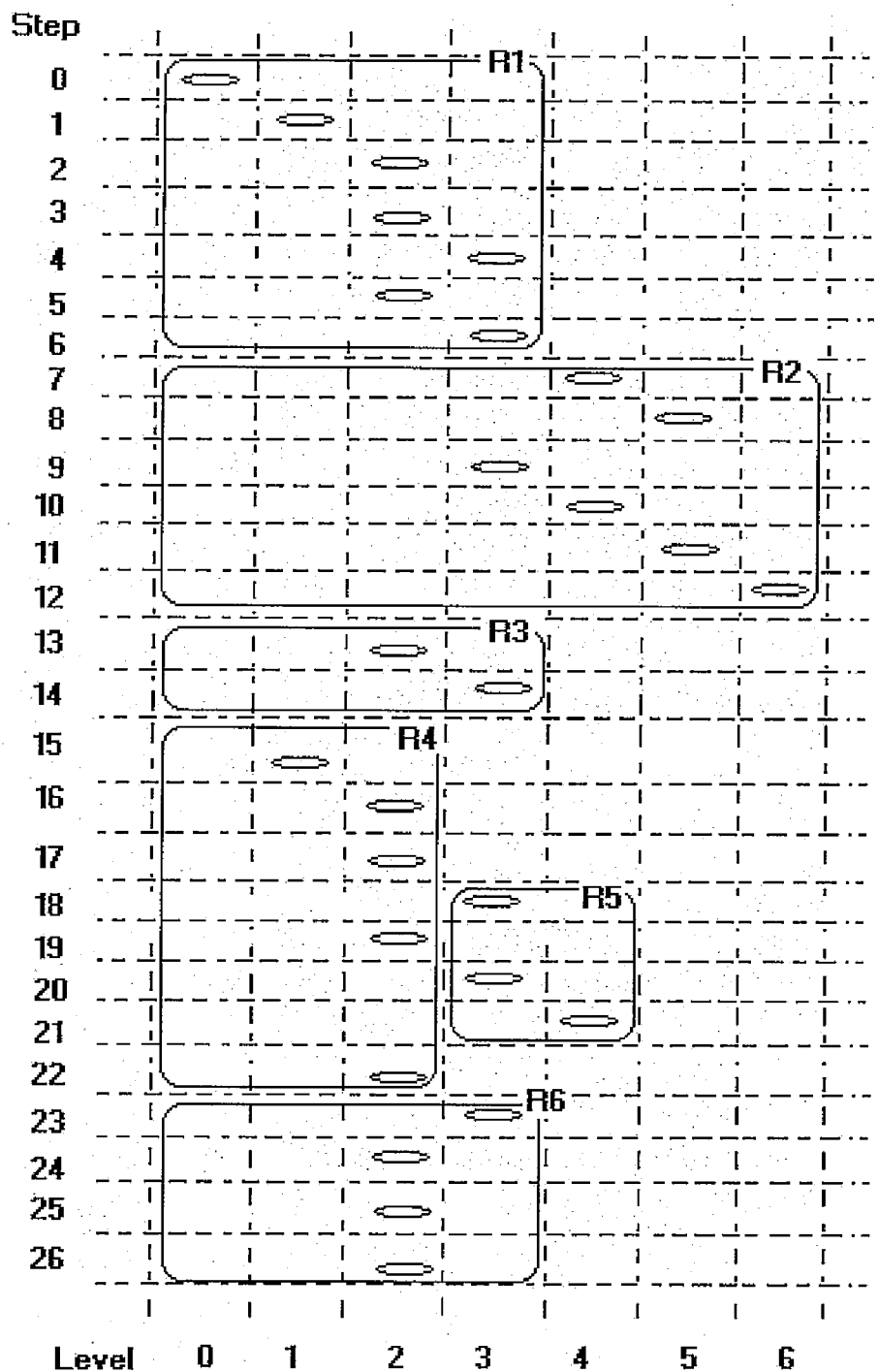
FIG. 18c illustrate regions R1 through R6 formed from the set of nodes.

FIGS. 18a–b illustrate a set of nodes and their respective mapping based on the above-mentioned method of assigning a step number every time a child node is descended. FIG. 18c illustrates regions R1 through R6 formed from the set of nodes wherein the parameters of R1 through R6 are provided below in Table 6:

TABLE 6

| | Min Step | Min Level | Max Step | Max Level |
|---|---|---|---|---|
| R1 | 0 | 0 | 6 | 3 |
| R2 | 7 | 0 | 12 | 6 |
| R3 | 13 | 0 | 14 | 3 |
| R4 | 15 | 0 | 22 | 2 |

TABLE 6-continued

|     | Min Step | Min Level | Max Step | Max Level |
|-----|----------|-----------|----------|-----------|
| R5  | 18       | 3         | 21       | 4         |
| R6  | 23       | 0         | 26       | 3         |

Figure 18D:
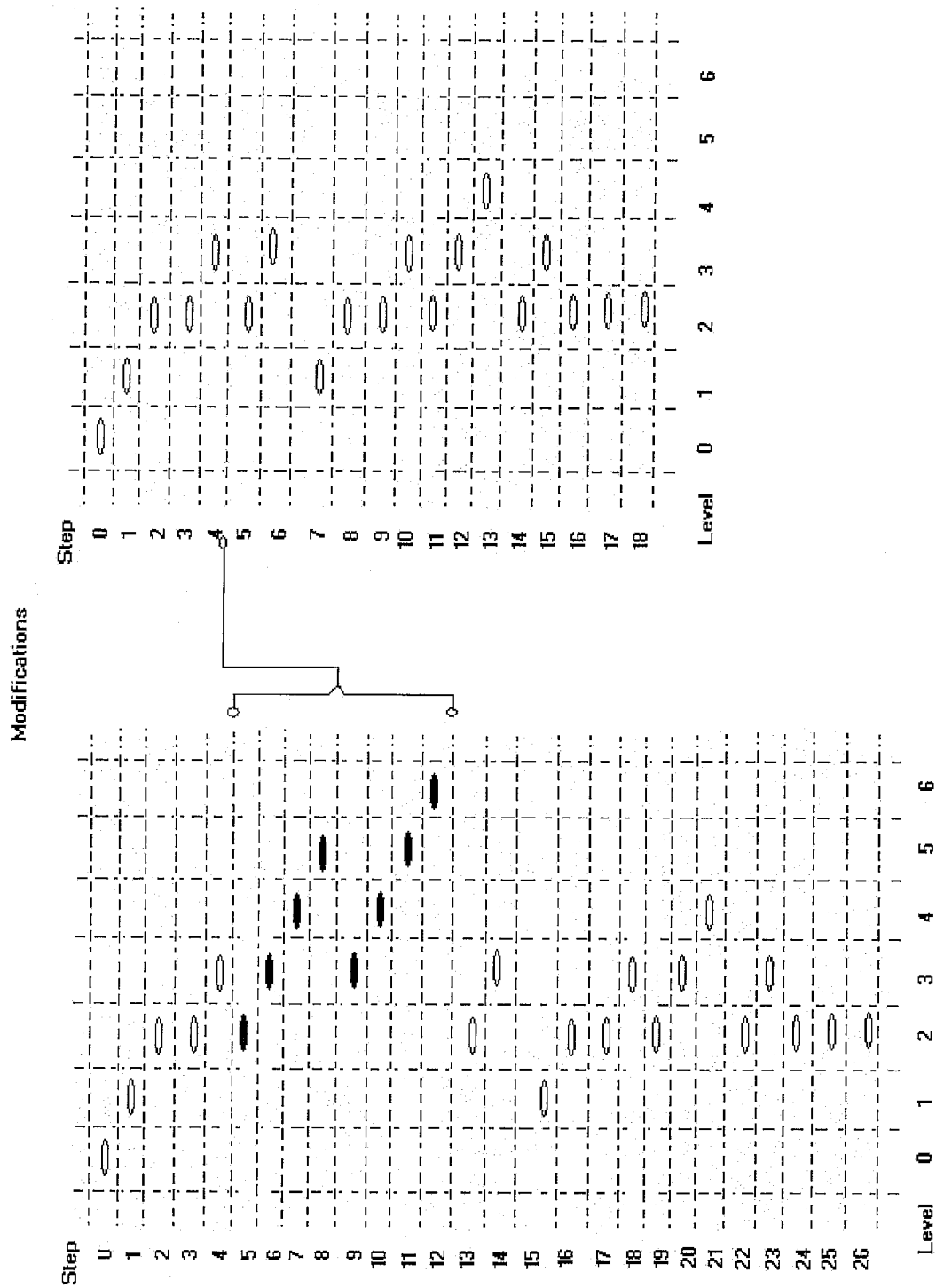
FIGS. 18d–f illustrate the effect of modifications on the above-mentioned parameters with respect to regions R1 through R6.
Figure 18E:
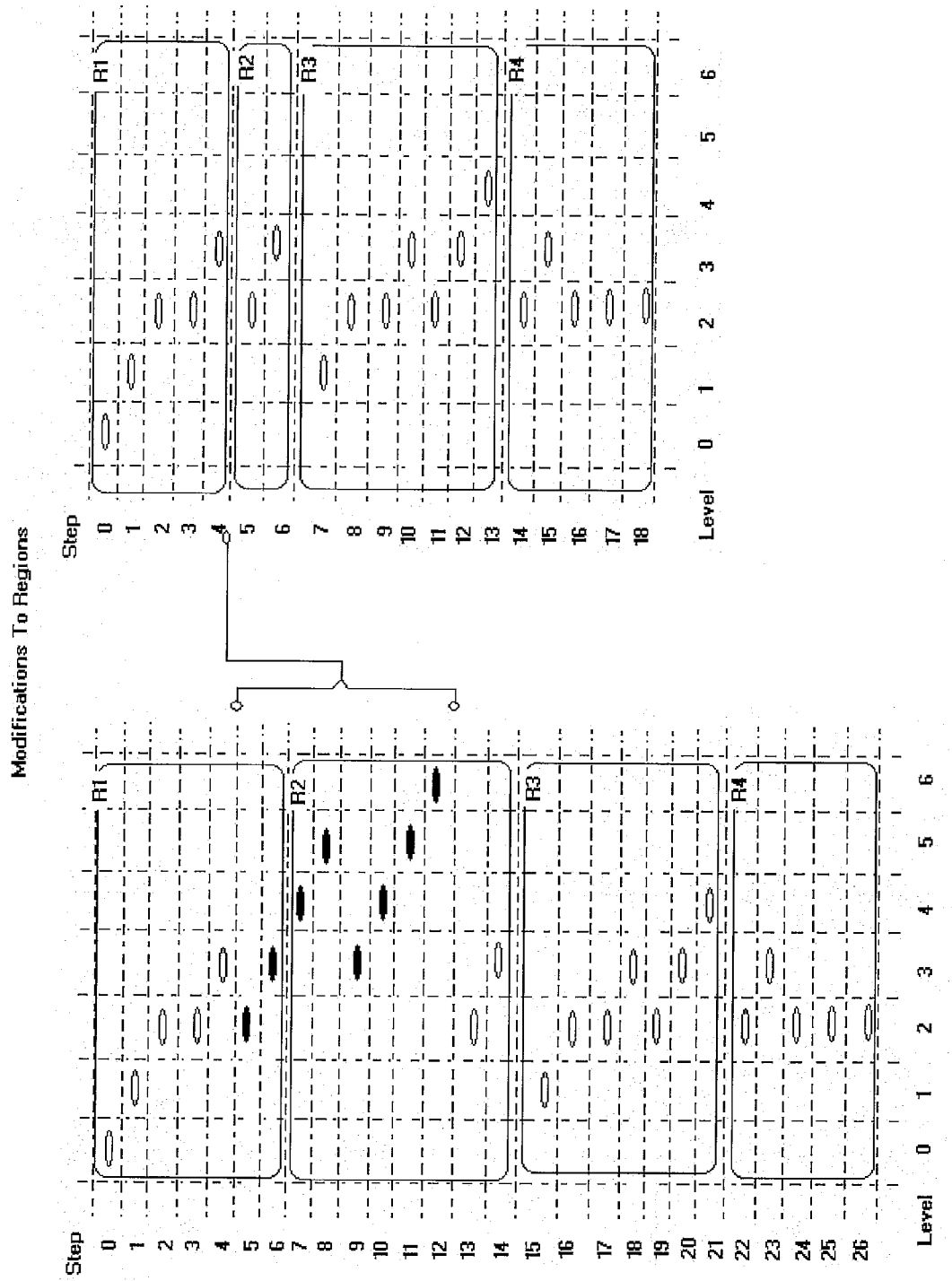
Figure 18F:
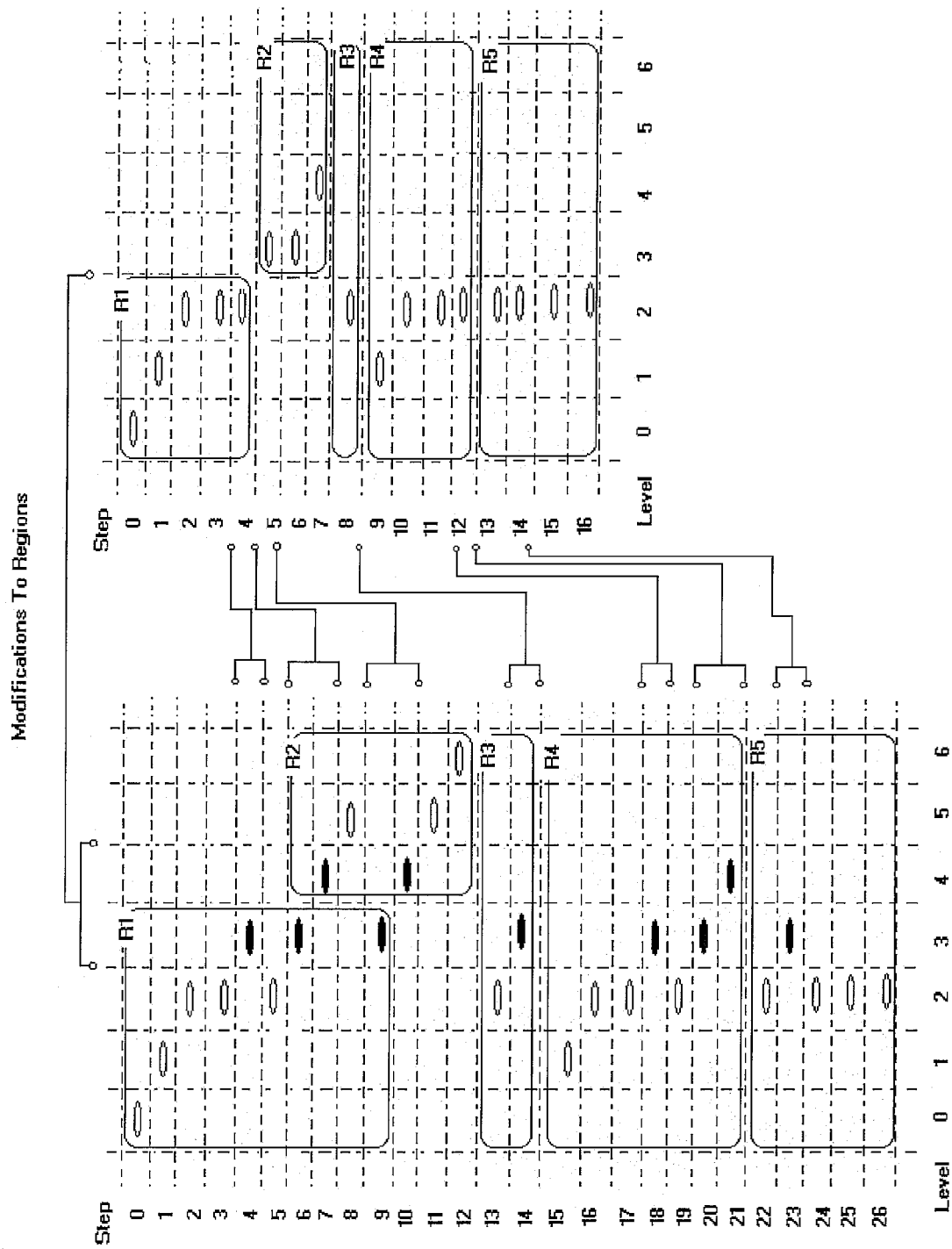

FIGS. 18d–f illustrate the effect of modifications on the above-mentioned parameters with respect to regions R1 through R6. Thus, as can be seen in the examples illustrated in FIGS. 18a–f, the specific algorithm used to compute the steps can vary and, hence, should not be used to limit the scope of the present invention.

Figure 19:
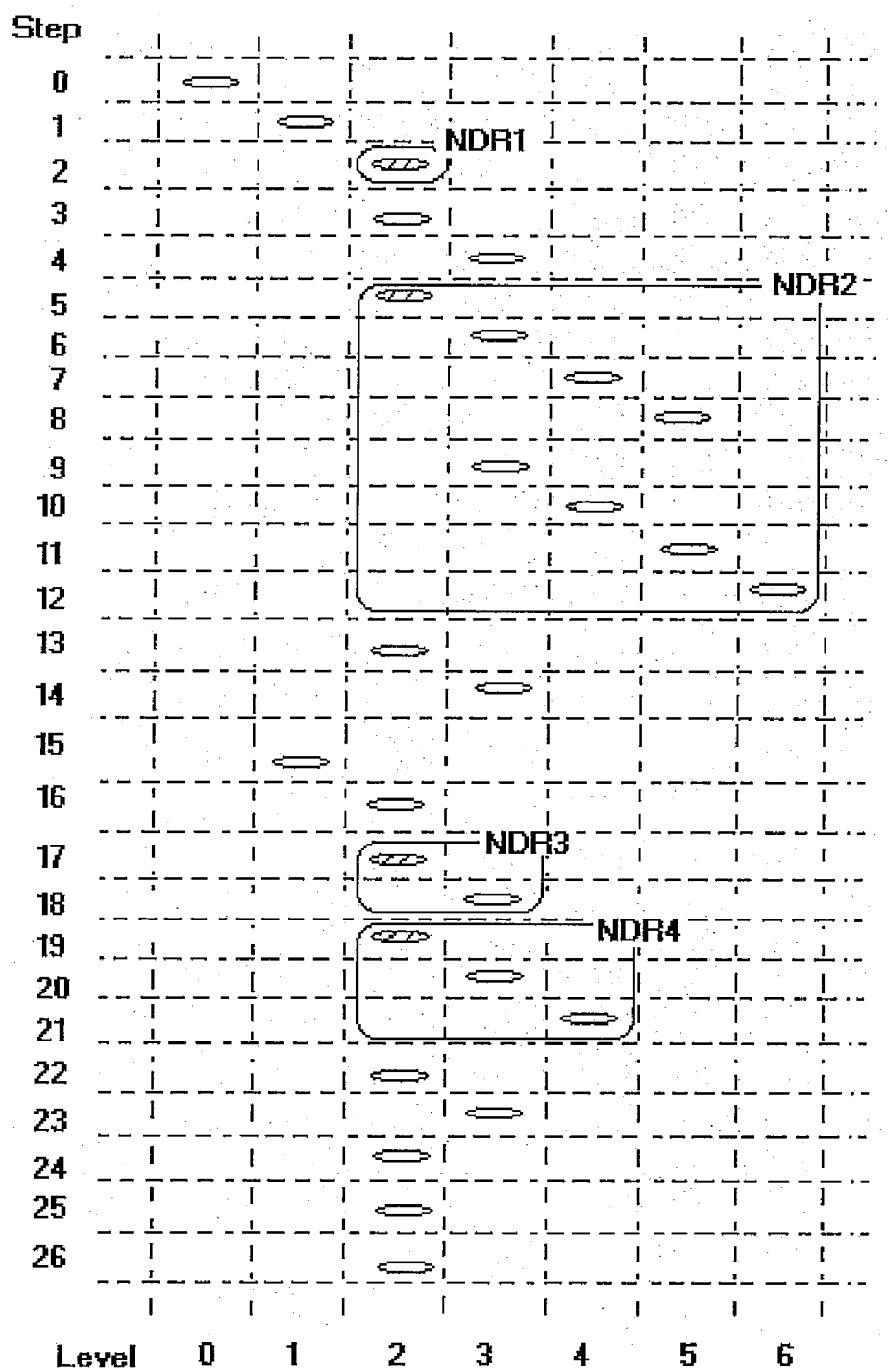
FIG. 19 illustrates nodes grouped by node descendant regions.

Similarly, regions can be grouped in a varying fashion. For example, as in FIG. 19, nodes can be grouped based upon node descendant regions. Node descendant regions are regions that contain all nodes that are descendents of a particular node. FIG. 19 illustrates Node Descendant Regions NDR1–NDR4, whose parameters are summarized in Table 7 below:

TABLE 7

|      | Min Step | Min Level | Max Step | Max Level |
|------|----------|-----------|----------|-----------|
| NDR1 | 2        | 2         | 2        | 2         |
| NDR2 | 5        | 2         | 12       | 6         |
| NDR3 | 17       | 2         | 18       | 3         |
| NDR4 | 19       | 2         | 21       | 4         |

Thus, as can be seen in the example above, various rules can be used to identify regions among a set of nodes and, hence, such rules should not be used to limit the scope of the present invention.

The present invention's robust system and method for prefetching and page replacement takes advantage of the above-mentioned node structure representative of hierarchical data associated with a document, wherein ordering is based on the concept of isolated ordered regions.

Figure 20:
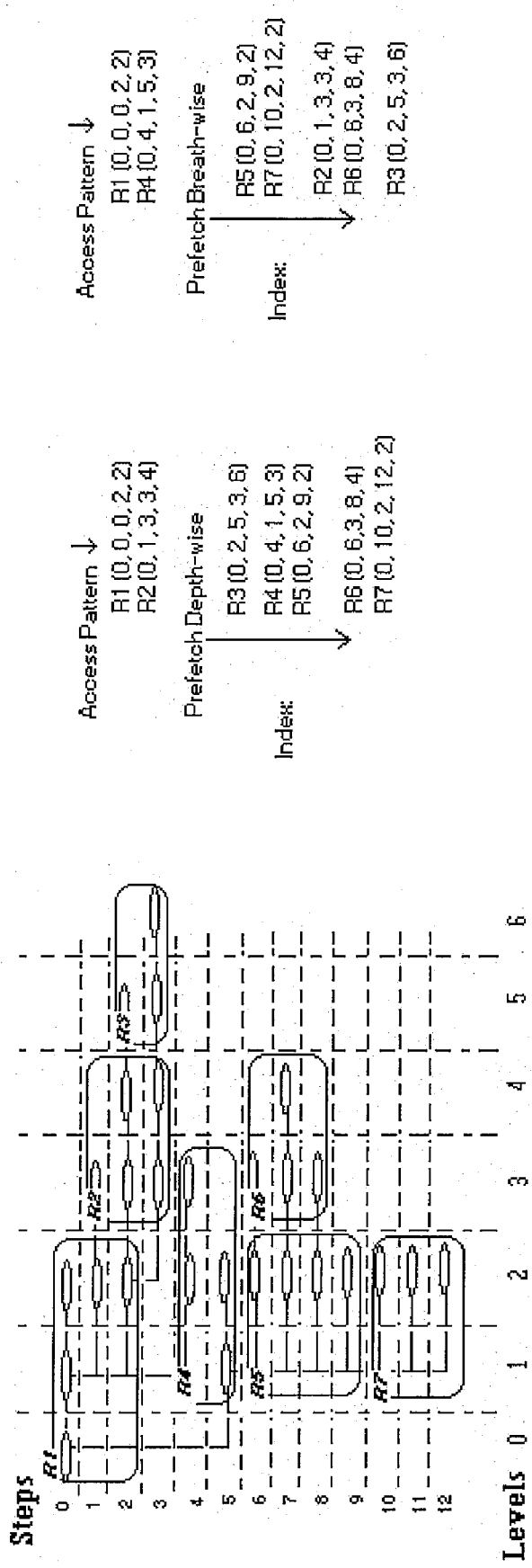
FIG. 20 illustrates the present invention's method for prefetching pages based upon access patterns.

For example, returning to the example depicted in FIGS. 8 and 9, after the regions of a document have an order, region access patterns that resemble certain orders in the index can be recognized. This is used to prefetch the pages where the next set of regions in the order is stored. For example, in FIG. 20, two access patterns are recognized by the system. The Prefetch Depth-wise pattern resembles a region access pattern with "slow" increasing steps, while the Prefetch Breath-wise pattern resemble a region access pattern with "slow" increasing levels. The index can be used to find the next set of regions and, consequently, the pages where the regions are stored, so that the pages can be prefetched.

In addition to the advantage of a robust prefetch algorithm, the present invention also provides for a page replacement algorithm based upon node order and hierarchical data. Hierarchical data can be stored by placing related sets of nodes into pages. While processing the nodes, a number of statistics can be gathered for each page. These statistics include the number of child pointers and parent pointers as well as the nodes relative order within the hierarchy.

Using these statistics, the system can tell the bufferpool component how the degree of probability that the pages traversed will be needed again in the future. This will cause the bufferpool component to keep the "most likely to be referenced" pages in memory longer.

The present invention can be used for the page replacement of bufferpool pages that contain nodes of a mark-up-based document, such as an XML document. As mentioned earlier, an XML document is stored when the system creates nodes that represent the entities of the document and the nodes are written out to pages. The nodes created are grouped (into regions) in various ways depending on anticipated access patterns. As regions are created, they are written out to bufferpool pages. Also, as mentioned earlier, a number of statistics are kept for each page. The Num Children and Num Parent values reflect the number of edges incident to the page. The Min Step and Min Level values reflect the order of the regions contained in the page with respect to the hierarchy. Regions with high Num Children and Num Parent values tend to be pages that are referenced often.

A region's Min Step/Min Level value reflects the region's order within the hierarchy. Regions with low Min Step/Min Level values tend to be regions which will be referenced often when the traversal moves from low Step/Level regions to high Step/Level regions. On the other hand, regions with high Min Step/Min Level values tend to be regions which will be referenced often when traversals move from high Step/Level regions to low Step/Level regions.

Using the Num Children, Num Parent, Min Step, and Min Level values associated with a page, the system can provide more information for the bufferpool component during page unfix. For example, in a traversal from a parent page to a child page where the parent pages Min Step/Min Level value is low and Num Children value is high, the system can unfix the parent page with a high weight count, as it is likely that the page will be referenced again. Subsequent pages will then have lower weights compared to their parent. This is illustrated in FIGS. 21a–j.

FIGS. 21a–j show chronologically, from left to right and top to bottom, how bufferpool pages are used to read in pages on disk and how pages unlikely to be referenced again are chosen for replacement. In areas where there is an asterisk (*), a LRU-based page replacement algorithm would have chosen a bad candidate.

Figure 21:
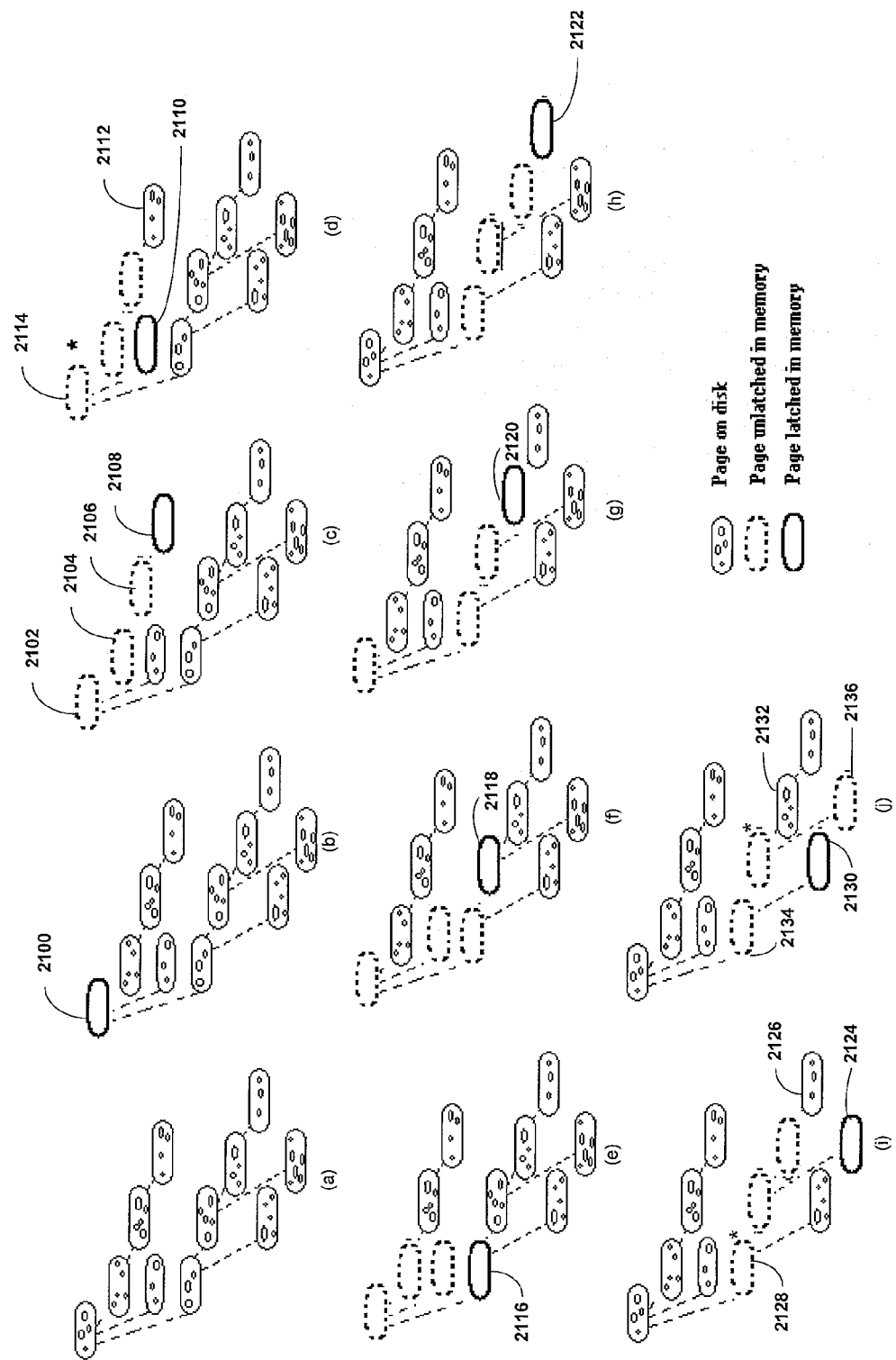
FIG. 21 illustrates the present invention's method for page replacement in bufferpools.

FIG. 21a illustrates an initial condition depicting pages (more specifically, 11 pages) stored on a disk. FIG. 21b illustrates a node 2100 that represents a page that is latched (or pinned) in memory. For the purposes of this example, it is assumed that, at any given time, four pages from the disk are present in a bufferpool. For example, FIG. 21c illustrates a scenario wherein four pages 2102, 2104, 2106, and 2108 are currently in use and are present in the bufferpool, wherein page 2108 also happens to be the page that is latched in memory.

Next, in FIG. 21d, the page that is latched in memory is changed to page 2110. Based upon the present invention, the page that gets replaced in the buffer is page 2112. This decision is made based upon using the number of children nodes, number of parent nodes, min step, and min level values associated with a page. As with the prior art systems that use the least recently used (LRU) algorithm, page 2114 would have been dropped out of the bufferpool, as it was the least recently used page. But, the present invention's method takes into account the fact that page 2114 has a plurality of children and, hence, associates a higher probability that the page 2114 will be accessed again in the future. Thus, page 2114 is kept in the bufferpool, while page 2112 (which does not have any children) is dropped from the bufferpool.

It should be noted that, although systems that drop pages based upon the most recently used (MRU) algorithm would have also picked page 2112 as the page to dropped from the bufferpool, such systems do not benefit from the decision being made based upon taking into account factors such as number of children nodes, number of parent nodes, min step, and min level values associated with a page. Additionally, as will be seen later, the present invention's method does not mirror the results of neither the MRU not LRU algorithms.

FIGS. 21e–g further illustrate how the page latched in memory changes traverses within the hierarchy (i.e., latched page 2116 in FIG. 21e, latched page 2118 in FIG. 21f, and latched page 2120 in FIG. 21g). FIG. 21h illustrates a scenario wherein page 2122 is latched in memory. Next, in FIG. 21i, the page that is latched in memory is changed to page 2124. Based upon the present invention, the page that gets replaced in the buffer is page 2126. This decision is made based upon taking into account: the number of children nodes, number of parent nodes, min step, and min level values associated with a page. A system based upon the LRU scheme would have picked page 2128 as the page to be replaced in the bufferpool. Similarly, when the latched page is page 2130, the present invention replaces page 2132 in the bufferpool, whereas LRU schemes would have replaced page 2134. Also, an MRU scheme would have replaced page 2136.

In cases where the traversal is not purely parent-to-child or child-to-parent, the plan generator can leave hints about certain pages (called pivot pages) which, when reached, can change the direction of the traversal and will likely be needed again after it is unfixed. These pages usually contain nodes involved in predicate evaluations. Therefore, when it comes time to unfix a pivot page, the system can unfix it with a higher weight. FIGS. 22a–g illustrate this aspect.

FIGS. 22a–g show how a page that contains nodes, and has pointers (2200, 2202, 2204) to other pages which contain their children nodes, might be prematurely replaced by a transactional system (specifically those pages marked with an asterisk) with a page replacement module that uses an LRU. But, the present invention provides for a system and method that properly assign weights to pages by considering various factors (such as, but not limited to, the number of children, region statistics, or hints left by the compiler) to identify which pages are likely to be kept in memory longer for retraversals to be accomplished efficiently.

Figure 22:
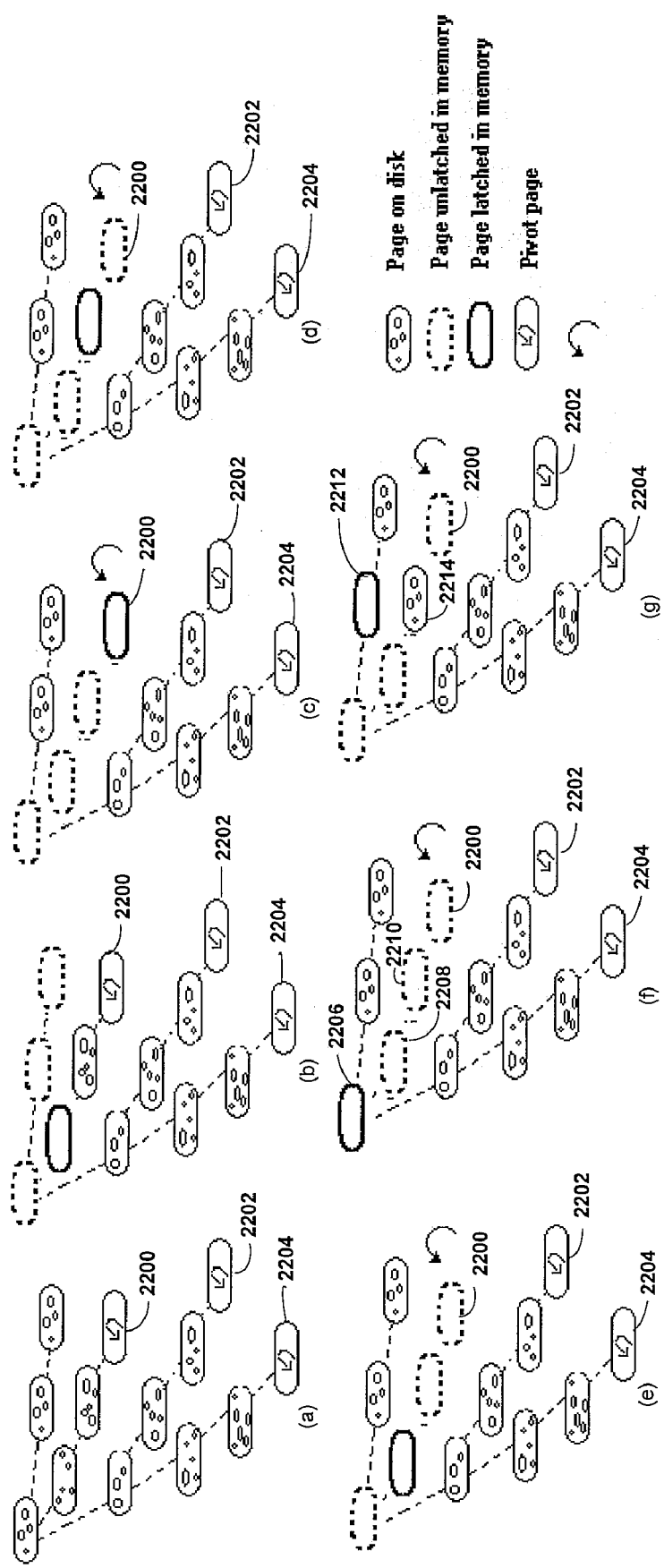
FIG. 22 illustrates the present invention's method for unfixing a pivot page.

This aspect of the present invention is best shown in FIG. 22f–g. In FIG. 22f, page 2206 is latched in memory, while pages 2208, 2210, and 2202 are in an unlatched (or unpinned) condition. Next, in FIG. 22g, page 2212 is latched in memory. Now, instead of removing pointer page 2200 from the bufferpool, the present invention notices that this is a pointer page and retains it in an unlatched state (as the probability of returning to a pointer page is high). Instead, page 2214 is removed from the bufferpool.

It should be noted that the number of pages depicted in for illustrative purposes only and should not be used to limit the scope of the present invention.

One aspect of this approach that makes it different from traditional LRU/MRU-based techniques is its bias towards keeping pages in memory as opposed to a bias towards throwing pages out of memory. Because of the nature of hierarchical data, access patterns will tend to visit pages that have non-leaf nodes multiple times—sometimes after pages with leaf nodes have been visited. As a consequence, pages with non leaf nodes need to stay in memory longer. That is why this approach, oriented toward that kind of access pattern, is more beneficial than LRU/MRU.

One difference hierarchical data accesses have over index node accesses lies in the fact that non-leaf index nodes tend to not be reaccessed and most of the time result in index leaf nodes accesses, whereas accesses to hierarchical data doesn't necessarily result in leaf page accesses.

Additionally, the present invention provides for an article of manufacture comprising computer-readable program code contained within implementing one or more modules for ordering nodes in a document (e.g., XML document). Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code-based products are software modules for: (a) instructing a computer to store a variable set of pages in memory; (b) recognizing access patterns and usage and fetching pages among the plurality of pages that fit the access patterns and usage; and (c) upon traversals within the plurality of pages: (i) instructing the computer to retain a subset of the variable set to include pages having a high probability of being revisited; and (ii) instructing the computer to dynamically replace remainder of the variable set with a page corresponding to said traversal; and during each traversal, one or more modules weights the variable set of pages to identify the subset to be retained and the remainder to be replaced, wherein the weighting is based upon at least the following numerical values associated with each page in said variable set of pages: number of children, number of parents, minimum step, and minimum level.

CONCLUSION

A system and method has been shown in the above embodiments for the effective implementation of a system and method for prefetching and page replacement. While various preferred embodiments have been shown and described, it will be understood that there is no intent to limit the invention by such disclosure but, rather, it is intended to cover all modifications falling within the spirit and scope of the invention, as defined in the appended claims. For example, the present invention should not be limited by number of nodes in bufferpool, size of bufferpool type of hierarchically-ordered document, the type of algorithm used to calculate the step, number of nodes, number of levels, number of steps, number and shape of regions, software/program, or computing environment.

The above enhancements are implemented in various computing environments. For example, the present invention may be implemented on a conventional IBM PC or equivalent, multi-nodal system (e.g., LAN) or networking system (e.g., Internet, WWW, wireless). All programming and data related thereto are stored in computer memory, static or dynamic, and may be retrieved by the user in any of: conventional computer storage, display (i.e., CRT), and/or hardcopy (i.e., printed) formats. The programming of the present invention may be implemented by one of skill in the art of mark-up-based languages and database programming.

The invention claimed is:

1. A system prefetching and replacing pages in storage, said storage retaining a plurality of pages, each of said pages comprising a plurality of nodes grouped into one or more regions, said system comprising:

(a) a memory management system storing a variable set of pages in memory;

(b) a prefetcher recognizing access patterns and usage and prefetching pages among said plurality of pages that fit said access patterns and usage; and (c) a page replacer working in conjunction with said memory management system, and during a traversal, weighting said variable set of pages to identify a subset to be retained and a remainder to be replaced, said subset including pages having a high probability of being revisited and said remainder replaced with a page corresponding to said traversal, and said weighting based upon identifying pivot pages defining traversals that are not strictly parent-to-child or child-to-parent and one or more of the following numerical values associated with each page in said variable set of pages: number of children, number of parents, and region statistics.

2. A system as per claim 1, wherein said region statistics are any of, or a combination of, the following: minimum step, minimum level, maximum step, or maximum level.

3. A system as per claim 1, wherein said plurality of nodes are associated with a mark-up language based document.

4. A system as per claim 3, wherein said mark-up based language is XML.

5. A system as per claim 1, wherein said regions are node descendant regions.

6. A system as per claim 1, wherein said system is implemented across networks.

7. A system as per claim 6, wherein one of said networks is any of the following: local area network (LAN), wide area network (WAN), the Internet, cellular network, or wireless network.

8. A method for robustly prefetching and replacing pages in a system storing a plurality of pages, each of said stored pages comprises a plurality of nodes grouped into one or more regions, said method comprising the steps of:

(a) storing a variable set of pages in memory;

(b) recognizing access patterns and usage and prefetching pages among said plurality of pages that fit said access patterns and usage;

(c) upon traversals within said plurality of pages:

(i) retaining a subset of said variable set to include pages having a high probability of being revisited; and (ii) dynamically replacing remainder of said variable set with a page corresponding to said traversal;

wherein, during each of said traversals, said variable set of pages is weighted to identify said subset to be retained and said remainder to be replaced, said weighting based upon at least the following numerical values associated with each page in said variable set of pages: traversals that are not strictly parent-to-child or child-to-parent, number of children, number of parents, and region statistics.

9. A method as per claim 8, wherein said region statistics are any of, or a combination of, the following: minimum step, minimum level, maximum step, or maximum level.

10. A method as per claim 8, wherein said plurality of nodes are associated with a mark-up language based document.

11. A method as per claim 10, wherein said mark-up based language is XML.

12. A method as per claim 8, wherein said regions are node descendant regions.

13. A method as per claim 8, wherein said method is implemented across networks.

14. A method as per claim 13, wherein one of said networks is any of the following: local area network (LAN), wide area network (WAN), the Internet, cellular network, or wireless network.

15. An article of manufacture comprising computer usable medium having computer readable program code embodied therein, said computer-readable program code executed by a computer to robustly prefetch and replace pages in a transactional system storing a plurality of pages, each of said stored pages comprises a plurality of nodes grouped into one or more regions, said medium comprising:

(a) computer readable program code instructing a computer to store a variable set of pages in memory;

(b) computer readable program code recognizing access patterns and usage and fetching pages among said plurality of pages that fit said access patterns and usage;

(c) upon traversals within said plurality of pages:

(i) computer readable program code instructing said computer to retain a subset of said variable set to include pages having a high probability of being revisited; and (ii) computer readable program code instructing said computer to dynamically replace remainder of said variable set with a page corresponding to said traversal;

wherein, during each of said traversals, computer readable program code weights said variable set of pages to identify said subset to be retained and said remainder to be replaced, said weighting based upon at least the following numerical values associated with each page in said variable set of pages: traversals that are not strictly parent-to-child or child-to-parent, number of children, number of parents, minimum step, and minimum level.

16. An article of manufacture as per claim 15, wherein said plurality of nodes are associated with a mark-up language based document.

17. An article of manufacture as per claim 16, wherein said mark-up based language is XML.

18. A system for prefetching and replacing pages in storage, said storage retaining a plurality of pages, said plurality of pages, at any given point in time, comprising a page pinned in memory, a set of pages unpinned in memory, remainder pages on said disk, each of said pages comprising a plurality of nodes grouped into one or more regions, said system comprising:

(a) a memory management system comprising said pinned page and said set of unpinned pages;

(b) a prefetcher recognizing access patterns and usage and prefetching pages among said plurality of pages that fit said access patterns and usage; and (c) a page replacer working in conjunction with said memory management system, and during each traversal:

updating a pointer to said pinned page to point to a newly pinned page corresponding to said traversal and unpinning previously pinned page, and weighting said previously pinned page and current set of unpinned pages to identify pages to be retained and a page to be replaced, said weighting identifying pages having a high probability of being revisited during future traversals and said weighting based upon at least the following numerical values associated with each page in said variable set of pages: number of children, number of parents, traversals that are not strictly parent-to-child or child-to-parent, and region statistics.

19. A method as per claim 18, wherein said plurality of nodes are associated with a mark-up language based document.

20. A method as per claim 19, wherein said mark-up based language is XML.

21. A method as per claim 18, wherein said regions are node descendant regions.

22. A method as per claim 18, wherein said method is implemented across networks.

23. A method as per claim 22, wherein said across network element is any of the following: local area network (LAN), wide area network (WAN), the Internet, cellular network, or wireless network.

24. An article of manufacture comprising computer usable medium having computer readable program code embodied therein, said computer-readable program code executed by a computer to prefetch and replace pages in storage, said storage retaining a plurality of pages, said plurality of pages, at any given point in time, comprising a page pinned in memory, a set of pages unpinned in memory, remainder pages on said disk, each of said pages comprising a plurality of nodes grouped into one or more regions, said medium comprising:
- (a) computer readable program code, in conjunction with a computer, implementing a memory management system comprising said pinned page and said set of unpinned pages;
- (b) computer readable program code, in conjunction with said computer, implementing a prefetcher recognizing access patterns and usage and prefetching pages among said plurality of pages that fit said access patterns and usage; and
- (c) computer readable program code, in conjunction with said computer, implementing a page replacer working in conjunction with said memory management system, and during each traversal:

computer readable program mode updating a pointer to said pinned page to point to a newly pinned page corresponding to said traversal;

computer readable program code unpinning previously pinned page; and computer readable program code weighting said previously pinned page and current set of unpinned pages to identify pages to be retained and a page to be replaced, said weighting identifying pages having a high probability of being revisited during future traversals and said weighting based upon at least the following numerical values associated with each page in said variable set of pages: number of children, number of parents, traversals that are not strictly parent-to-child or child-to-parent, and region statistics.

25. An article of manufacture as per claim 24, wherein said plurality of nodes are associated with a mark-up language based document.

26. An article of manufacture as per claim 25, wherein said mark-up based language is XML.

* * * * *